March 28, 1933.  S. W. SPARKS  1,902,975
METHOD OF AND APPARATUS FOR MAKING EXTRUDED SEAMLESS METAL SHAPES
Filed May 11, 1929  27 Sheets-Sheet 1
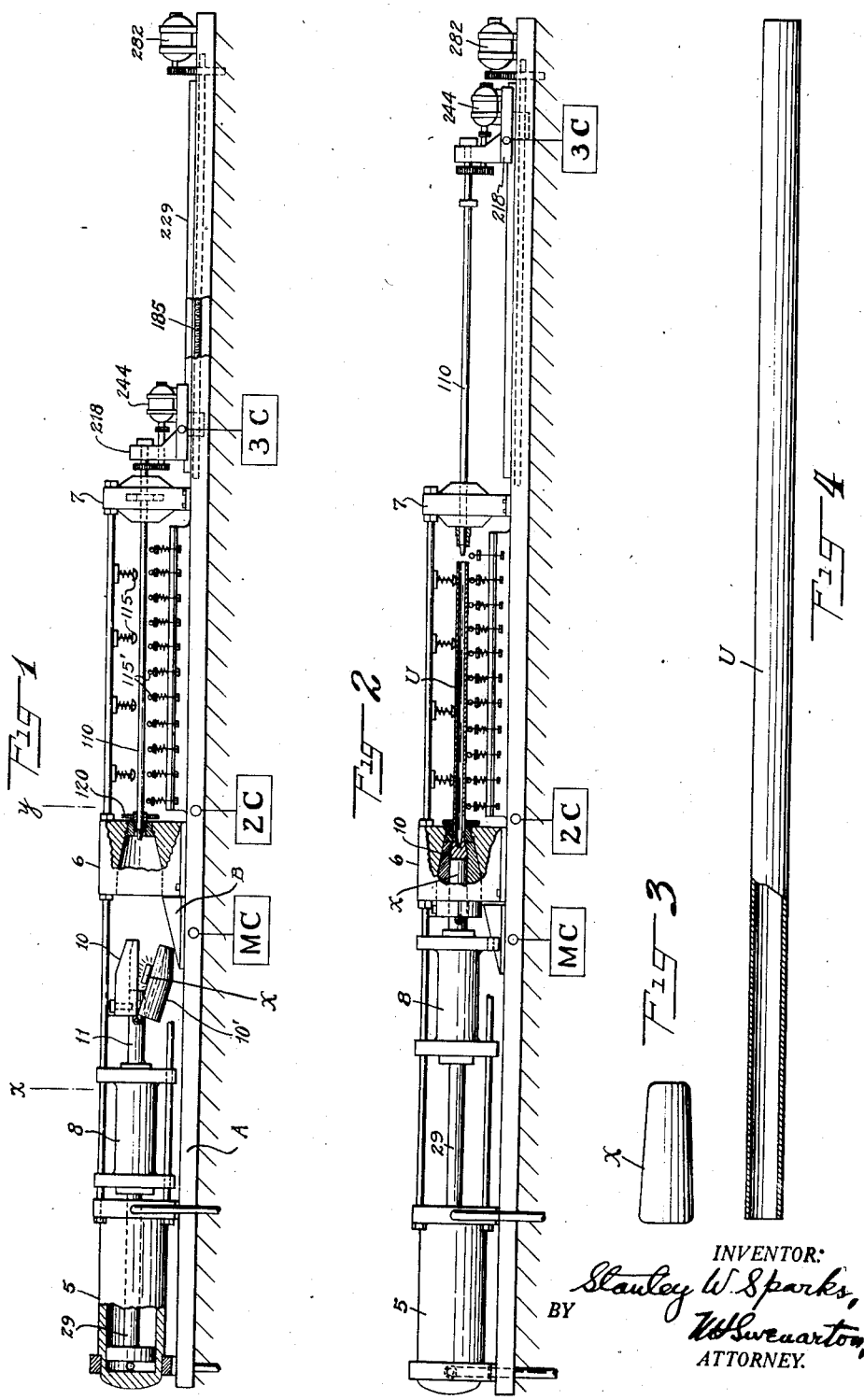
INVENTOR:
Stanley W. Sparks,
BY
ATTORNEY.

March 28, 1933. S. W. SPARKS 1,902,975
METHOD OF AND APPARATUS FOR MAKING EXTRUDED SEAMLESS METAL SHAPES
Filed May 11, 1929 27 Sheets-Sheet 2
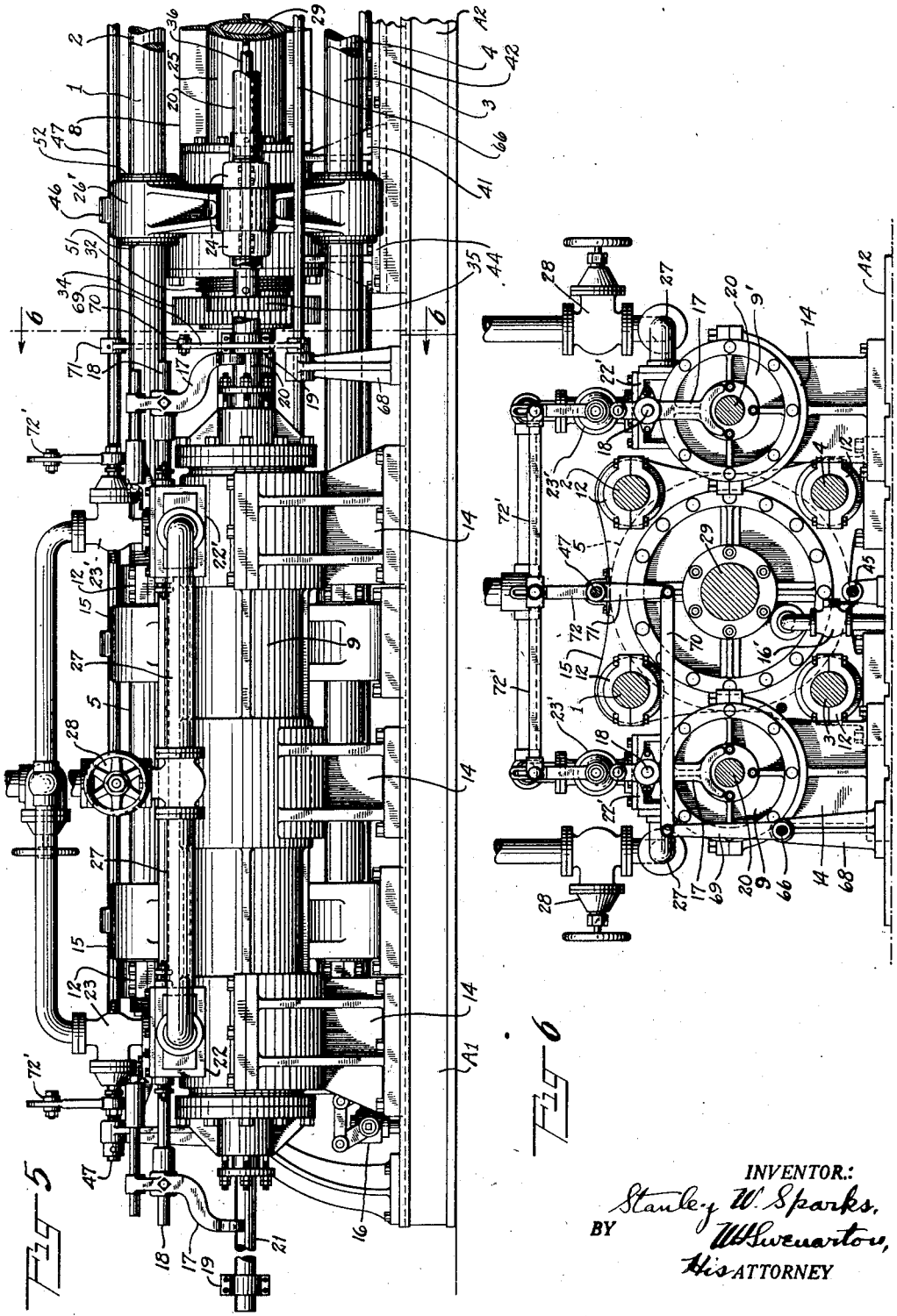
INVENTOR.:
Stanley W. Sparks,
BY W. Swenarton,
His ATTORNEY

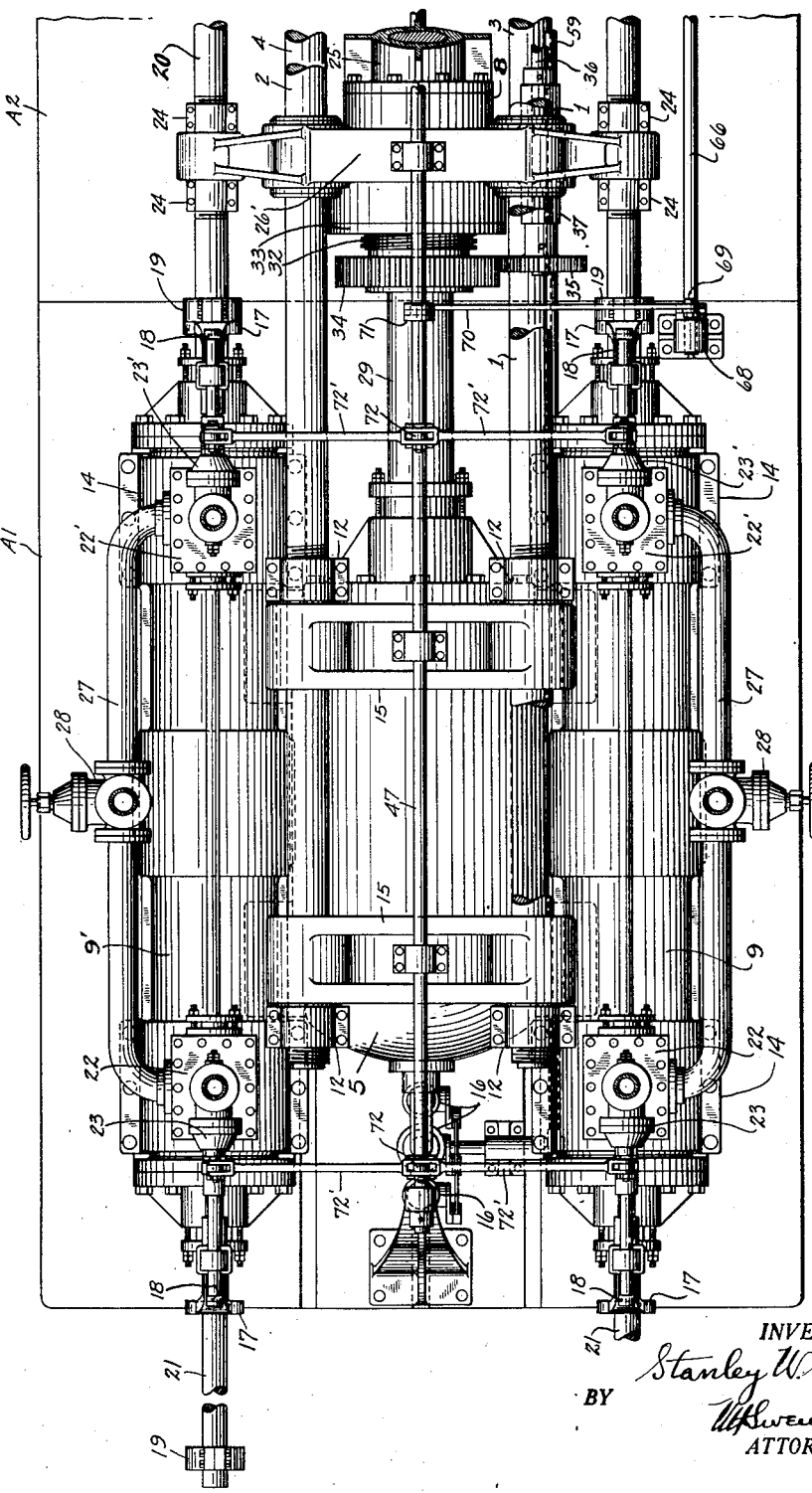

March 28, 1933.    S. W. SPARKS    1,902,975
METHOD OF AND APPARATUS FOR MAKING EXTRUDED SEAMLESS METAL SHAPES
Filed May 11, 1929    27 Sheets-Sheet 4
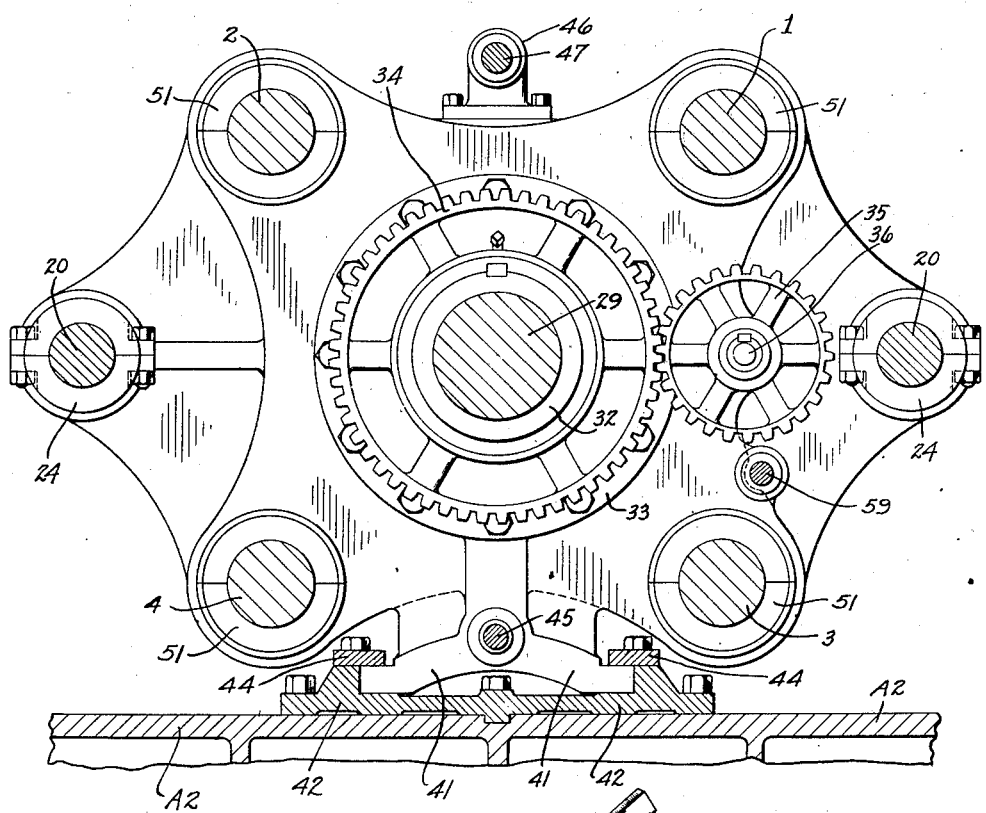
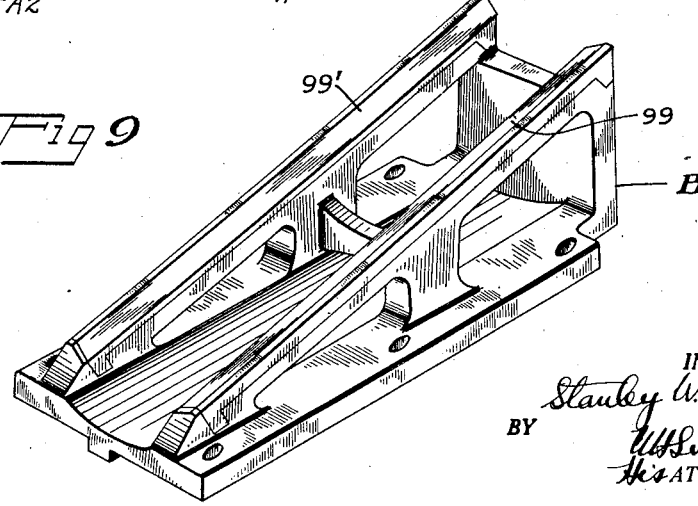
INVENTOR:
Stanley W. Sparks,
BY
His ATTORNEY

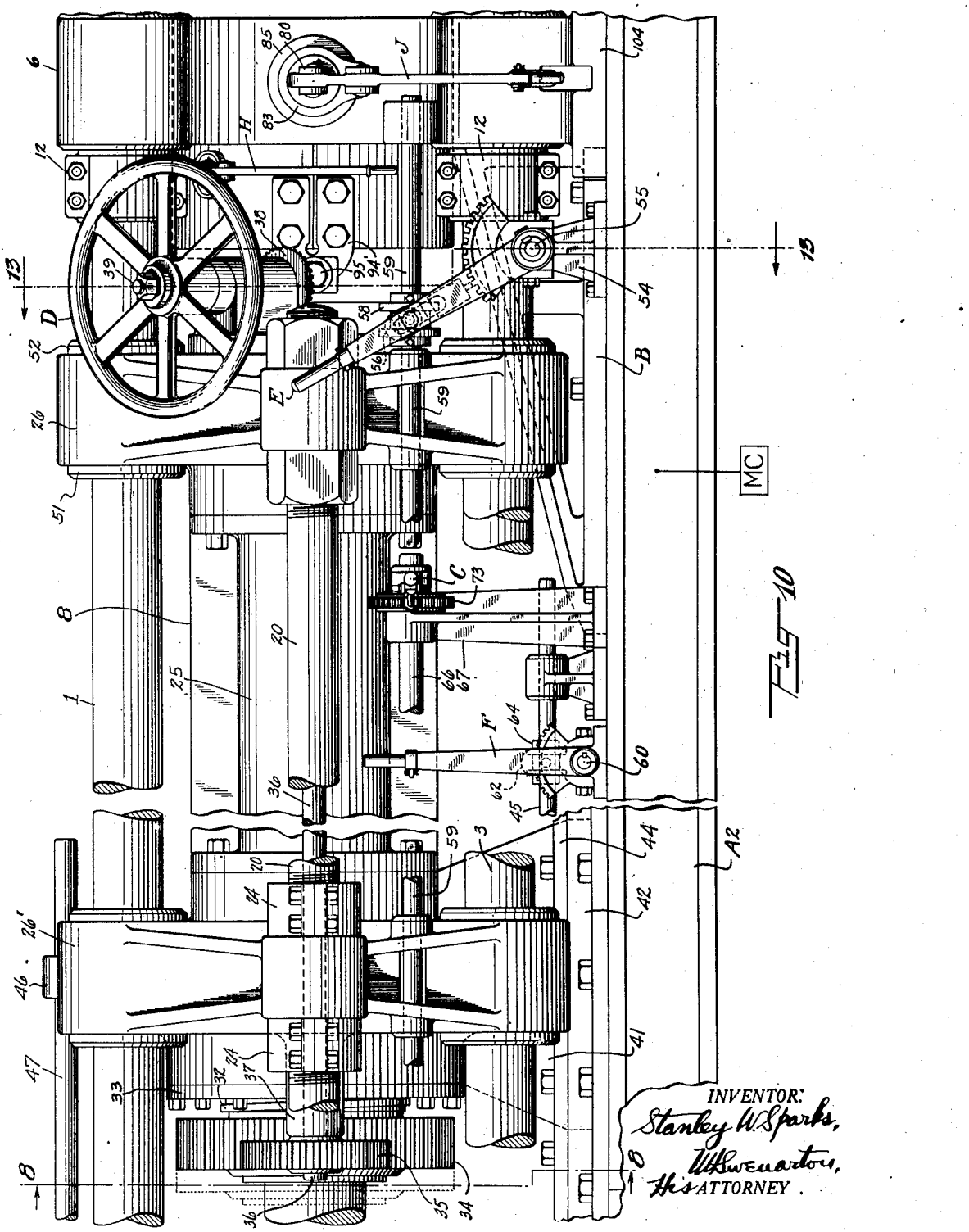

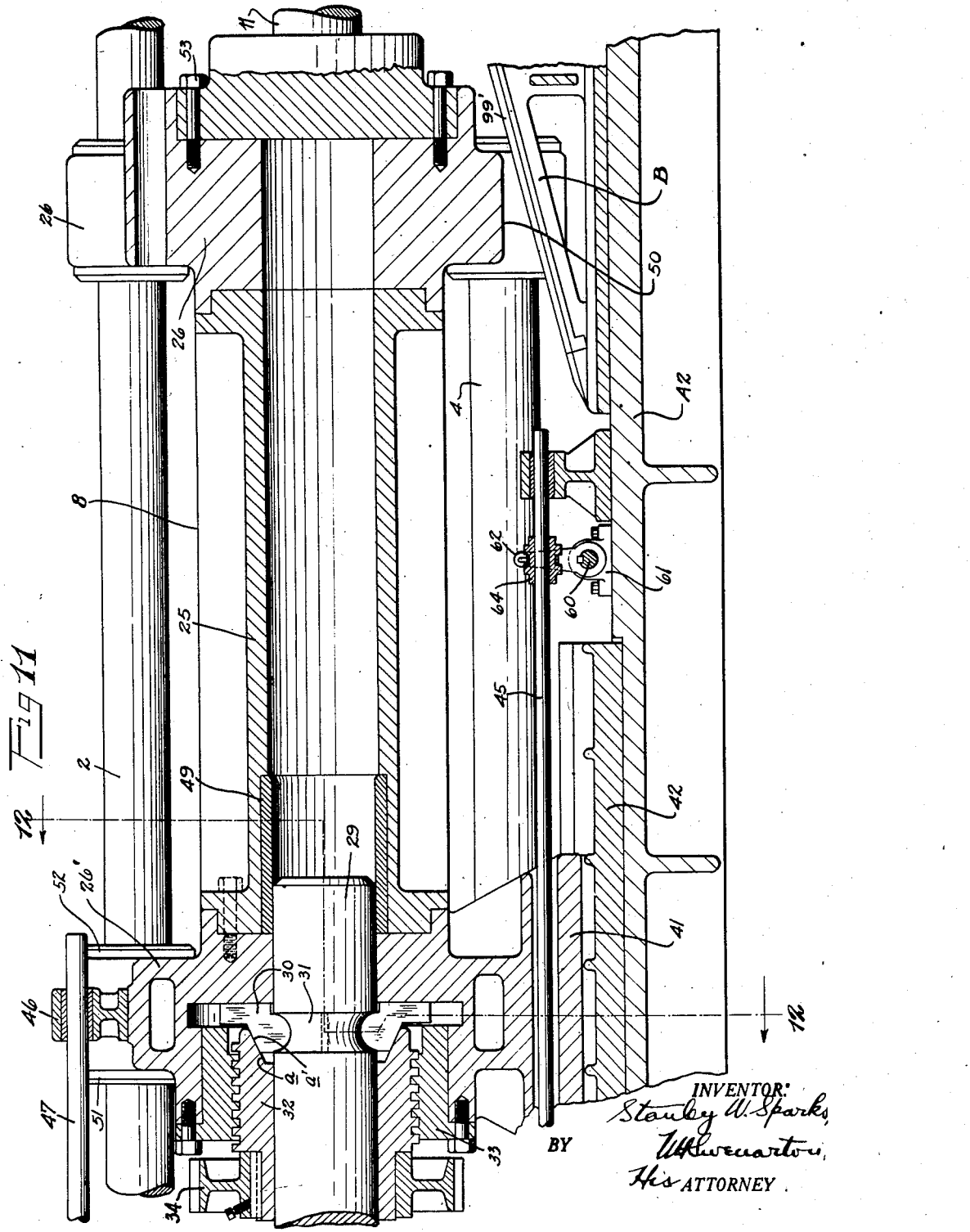

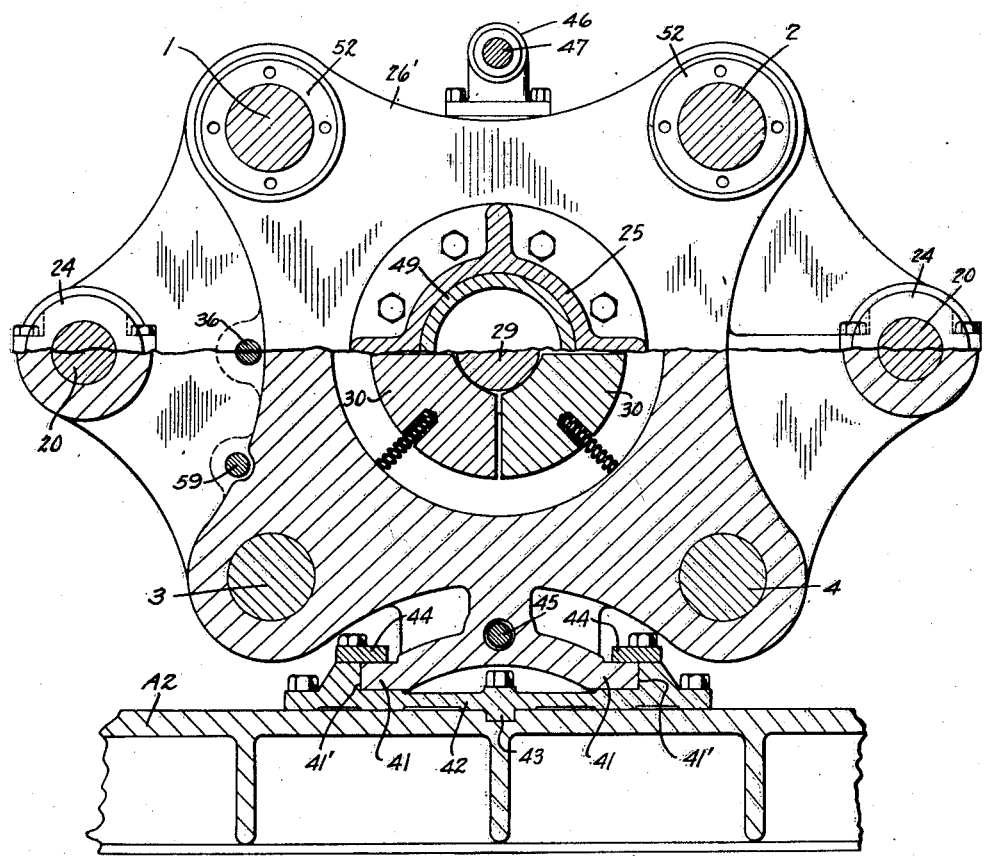

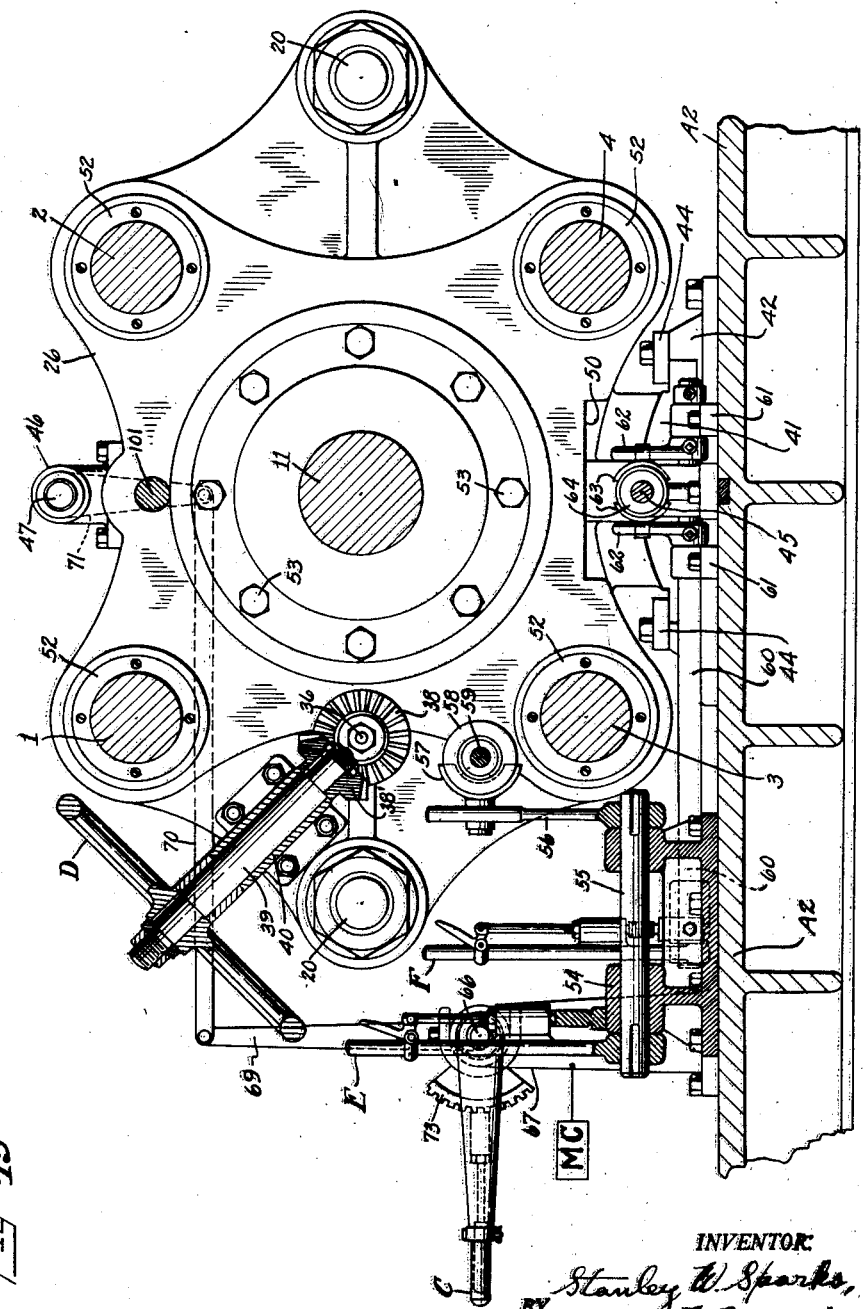

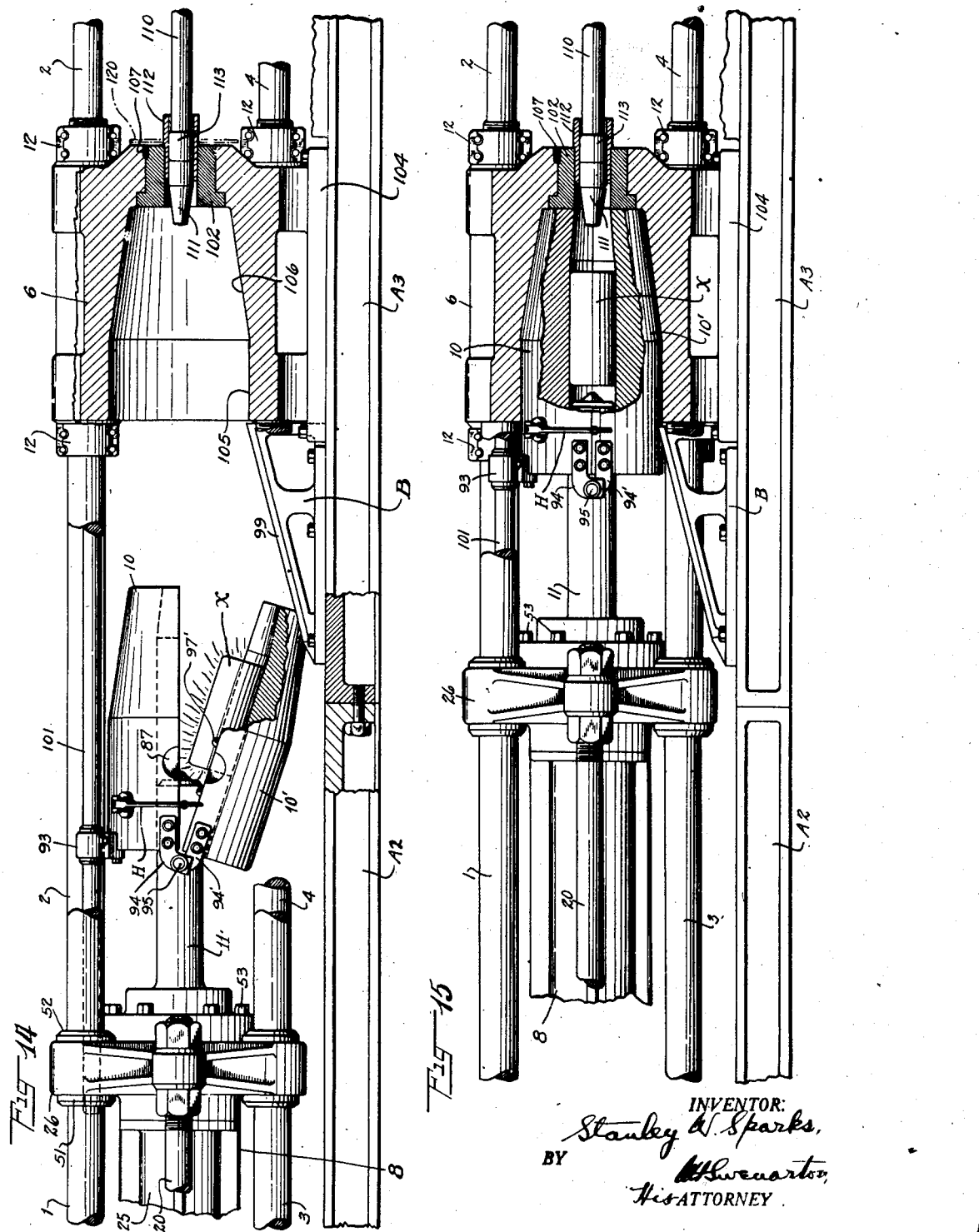

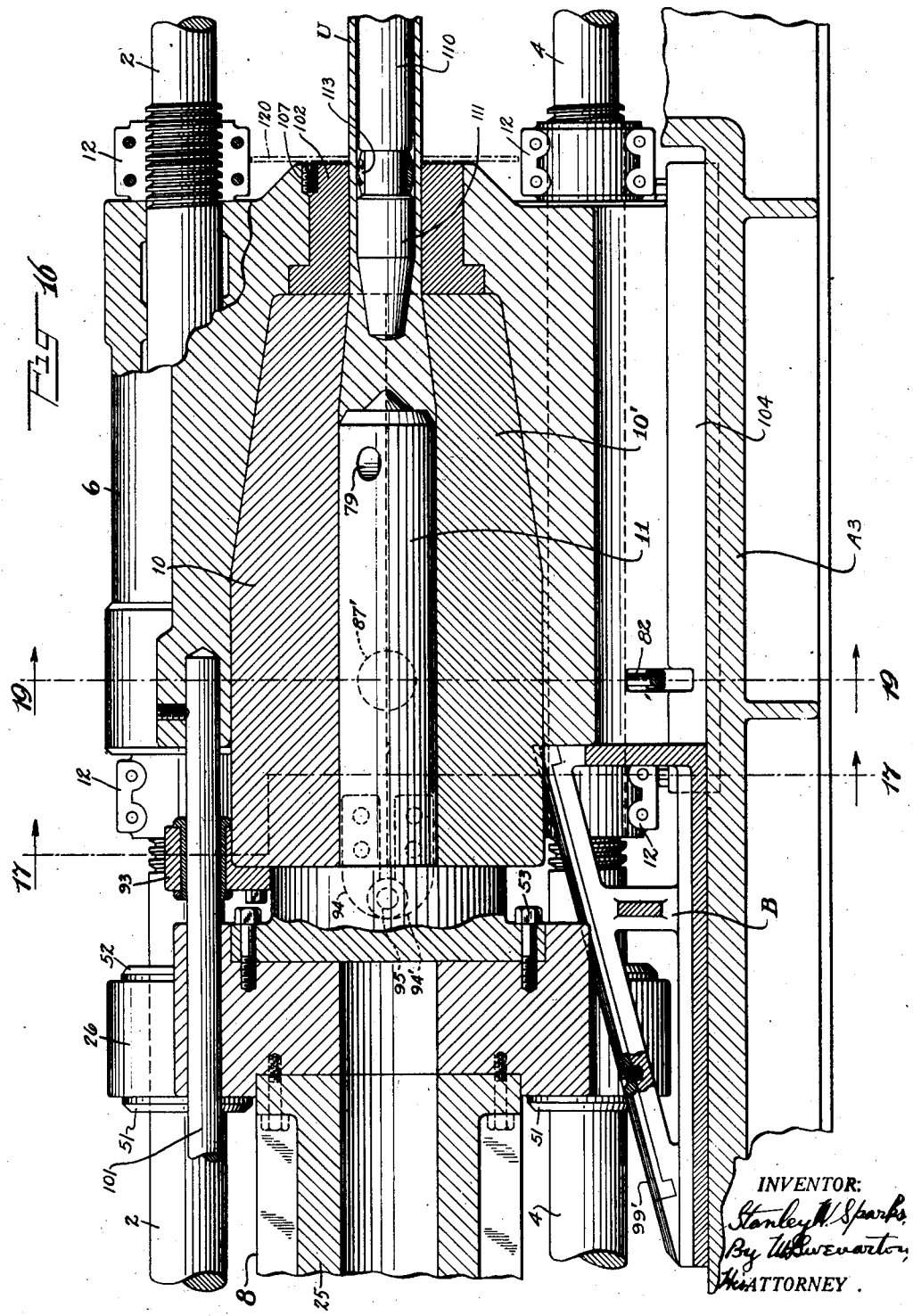

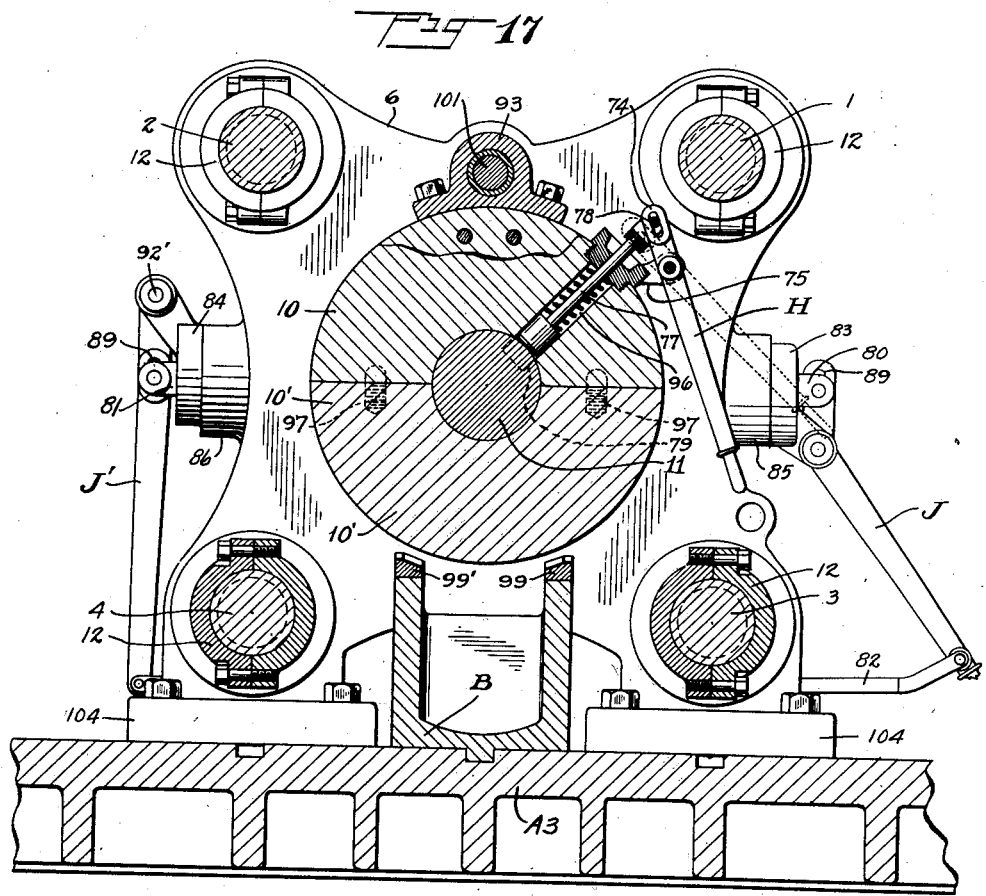

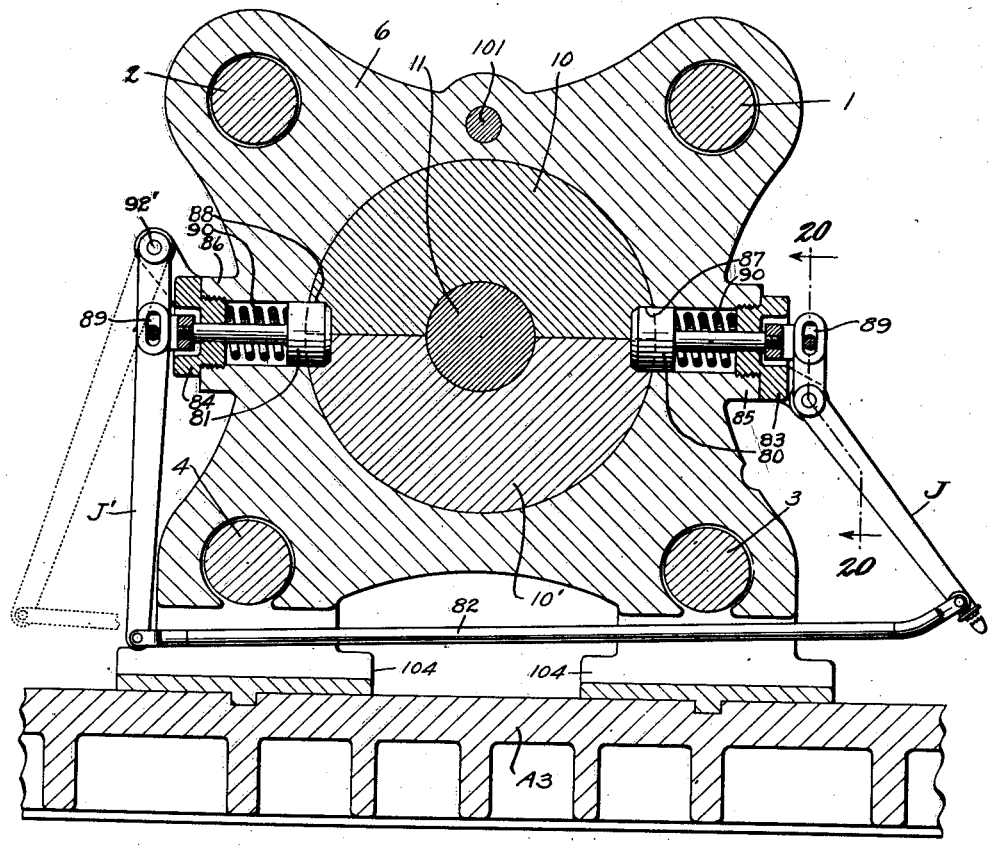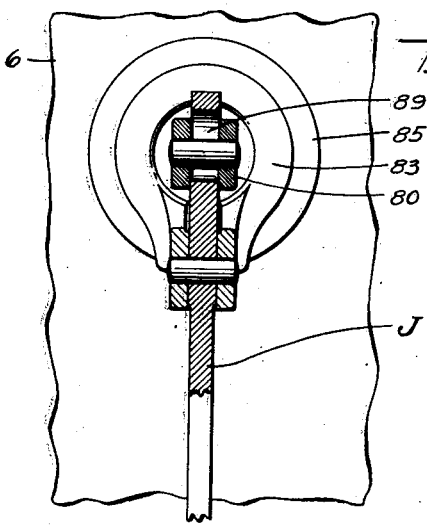

March 28, 1933. S. W. SPARKS 1,902,975
METHOD OF AND APPARATUS FOR MAKING EXTRUDED SEAMLESS METAL SHAPES
Filed May 11, 1929 27 Sheets-Sheet 13
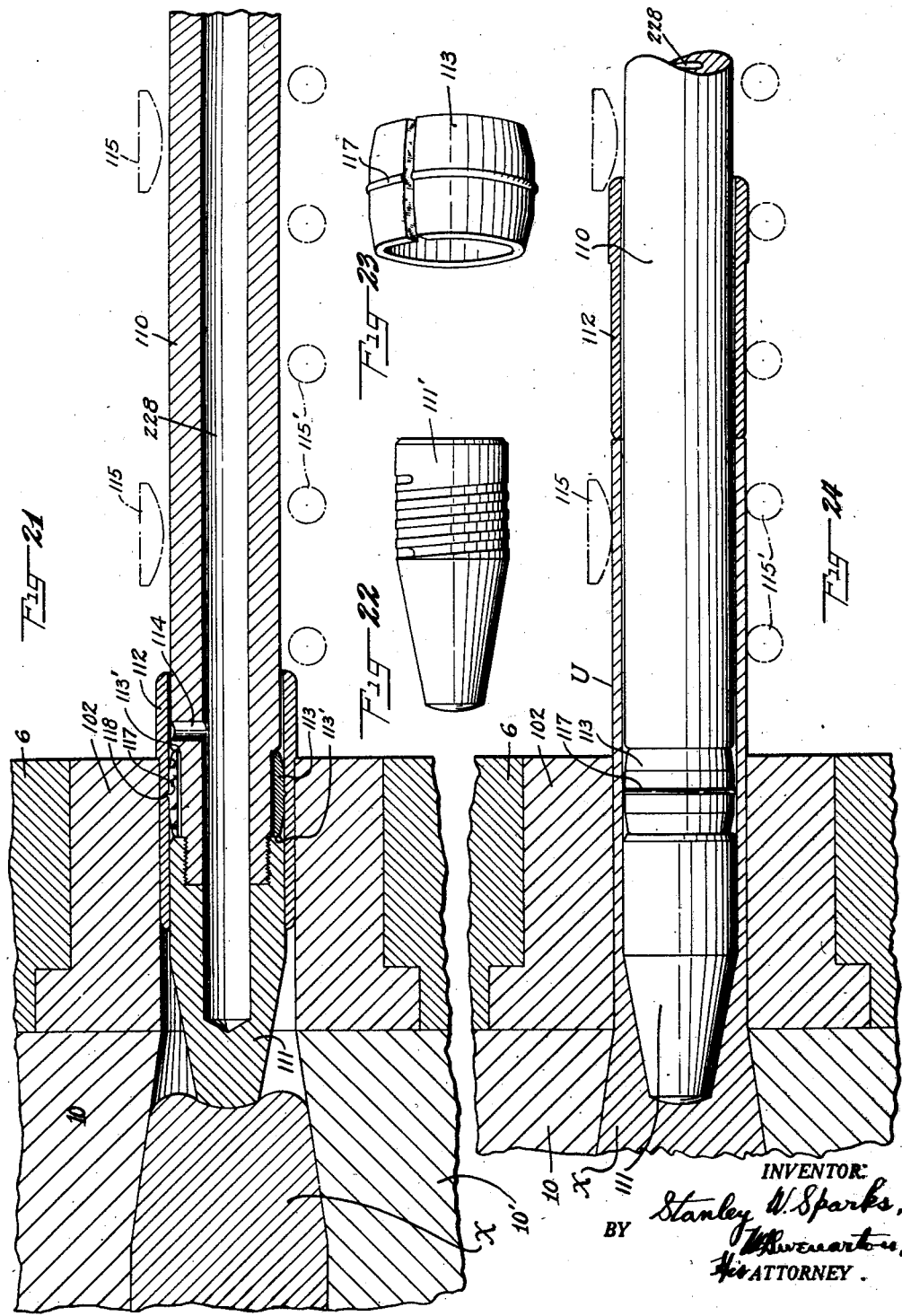

March 28, 1933. S. W. SPARKS 1,902,975
METHOD OF AND APPARATUS FOR MAKING EXTRUDED SEAMLESS METAL SHAPES
Filed May 11, 1929 27 Sheets-Sheet 14
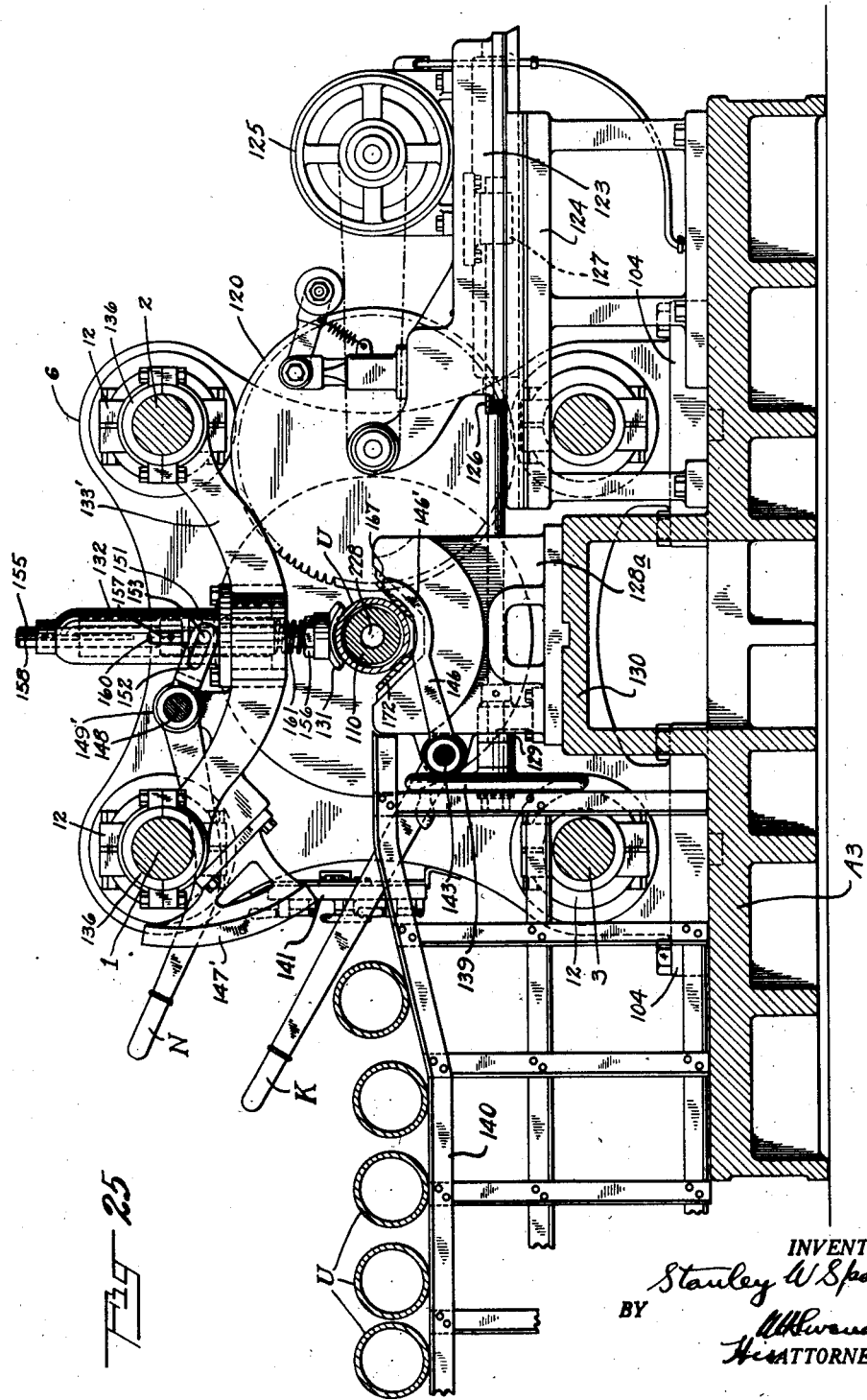
INVENTOR:
Stanley W Sparks,
BY
His ATTORNEY

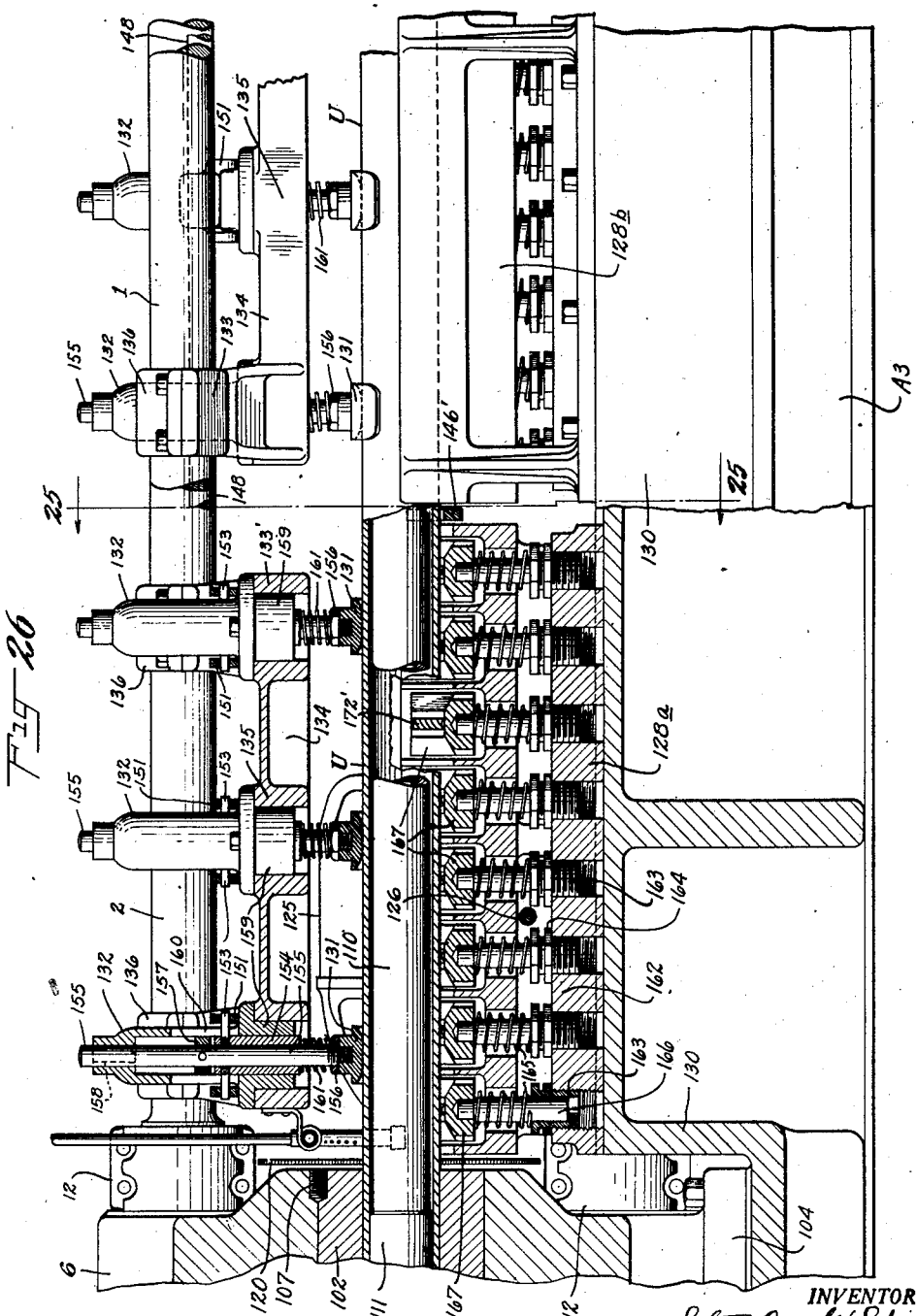

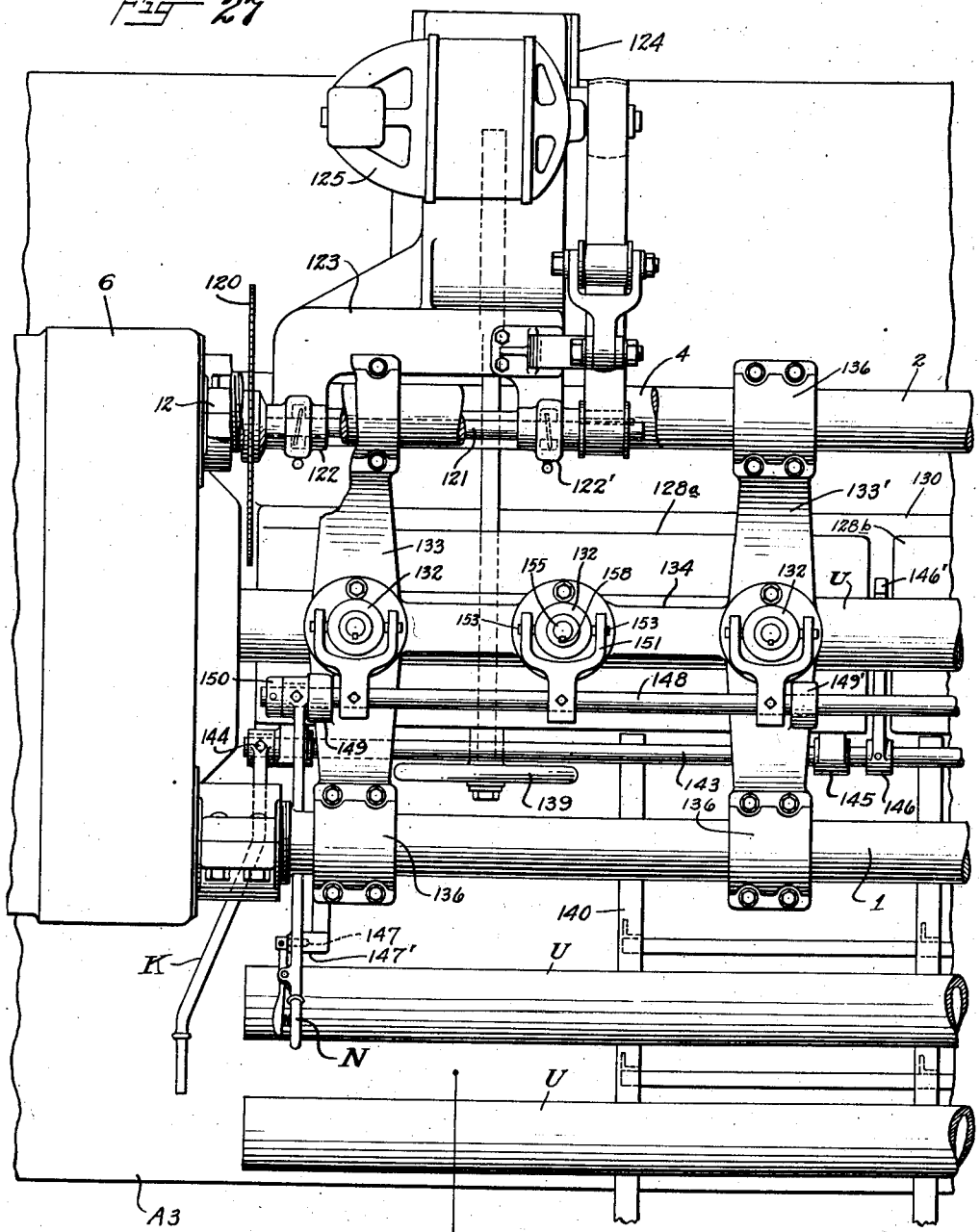

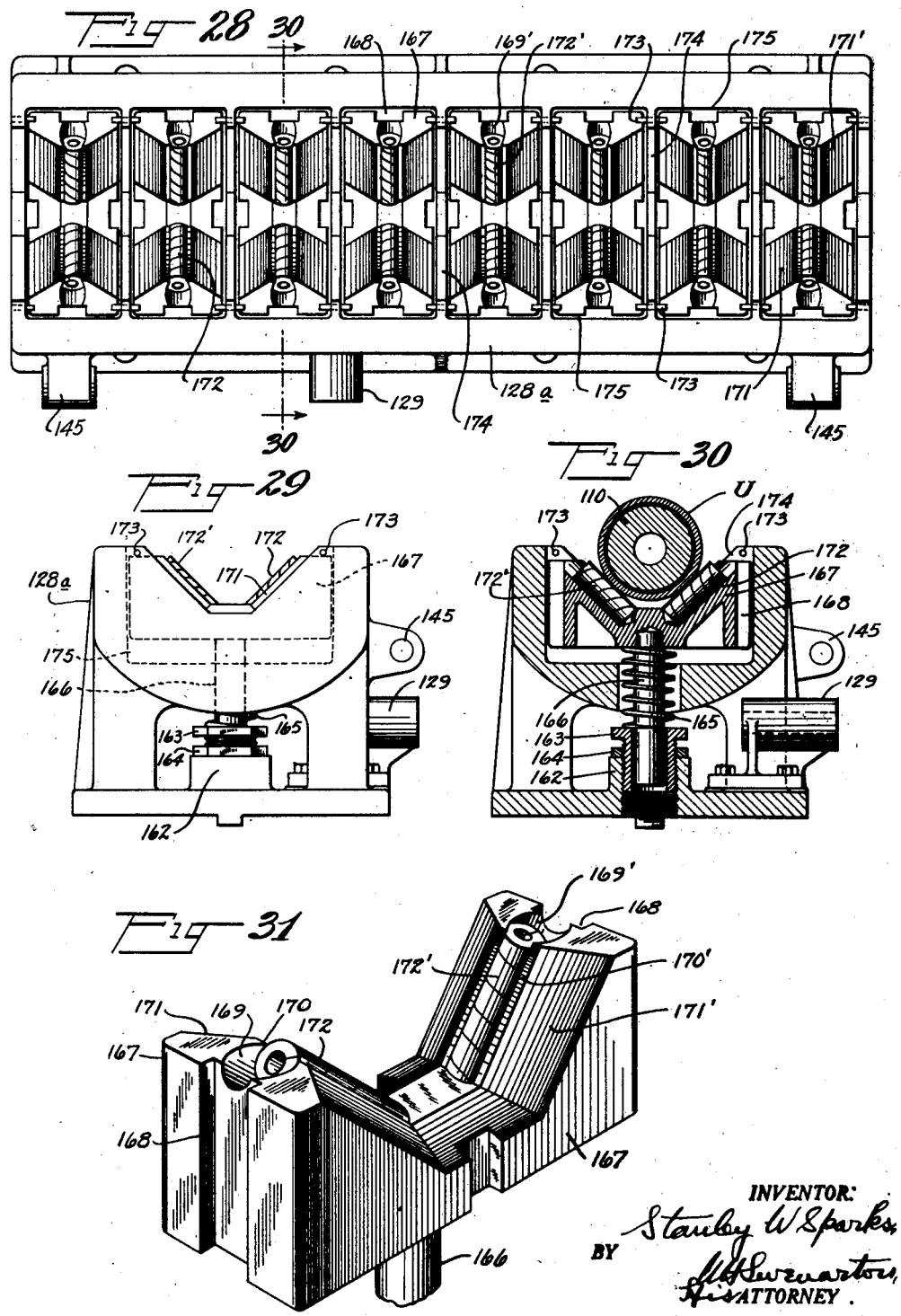

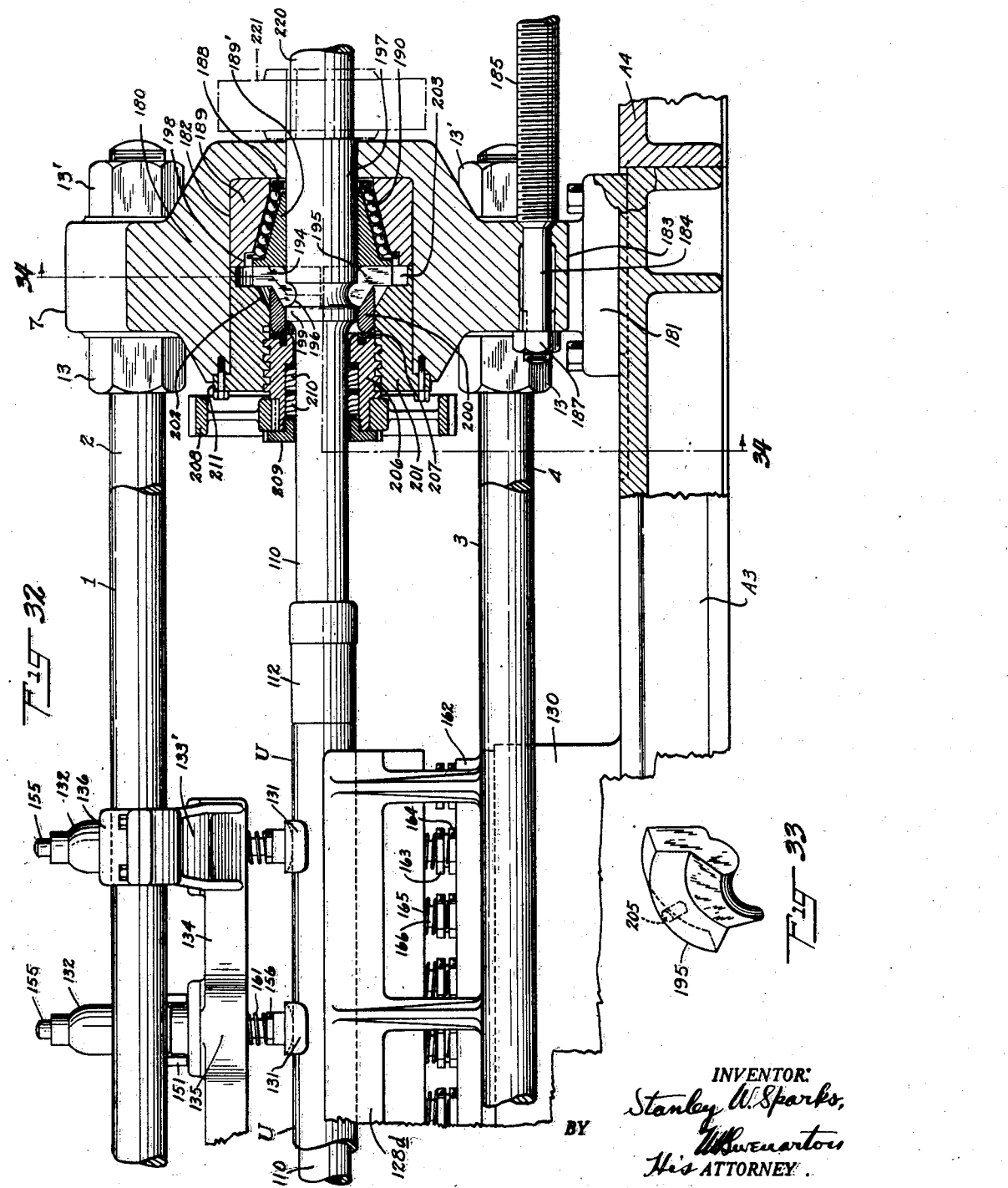

March 28, 1933.  S. W. SPARKS  1,902,975
METHOD OF AND APPARATUS FOR MAKING EXTRUDED SEAMLESS METAL SHAPES
Filed May 11, 1929   27 Sheets-Sheet 19
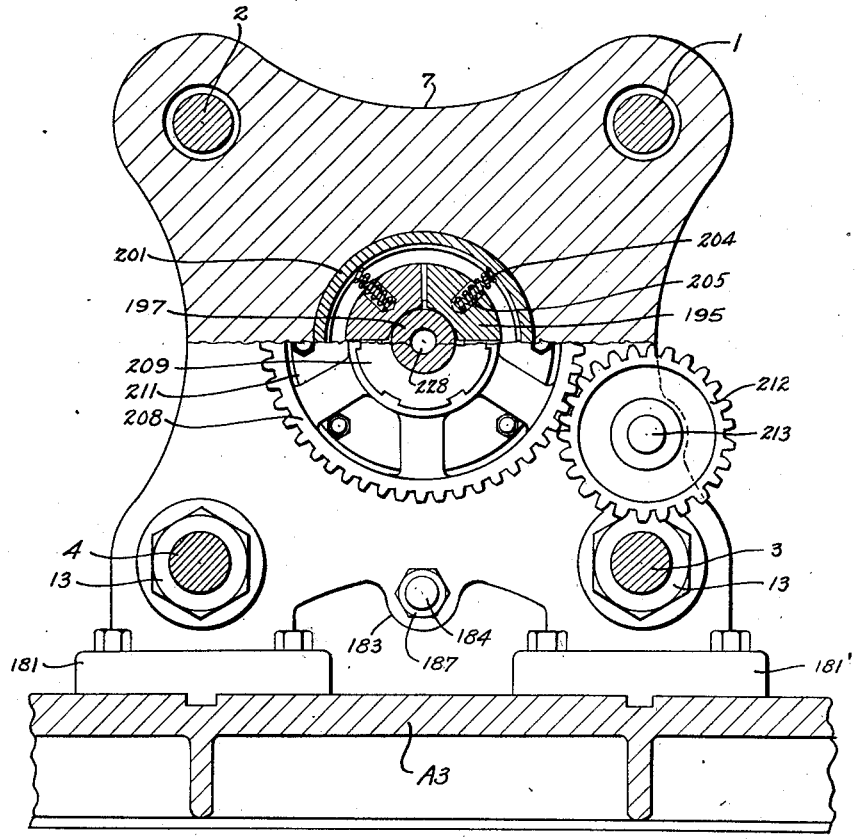
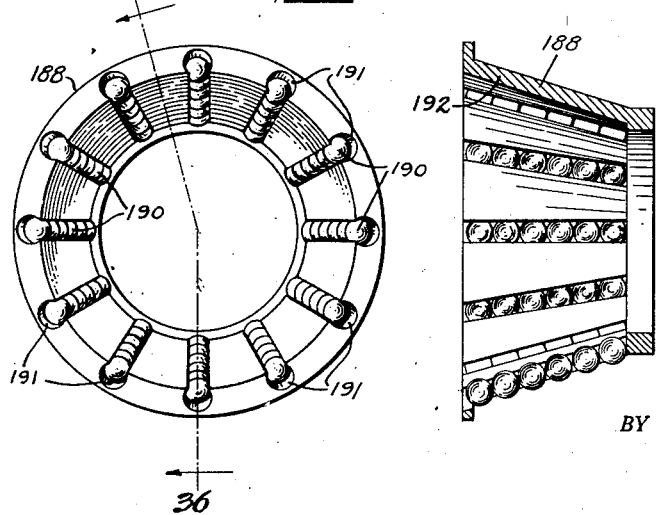
INVENTOR:
Stanley W. Sparks,
BY
His ATTORNEY.

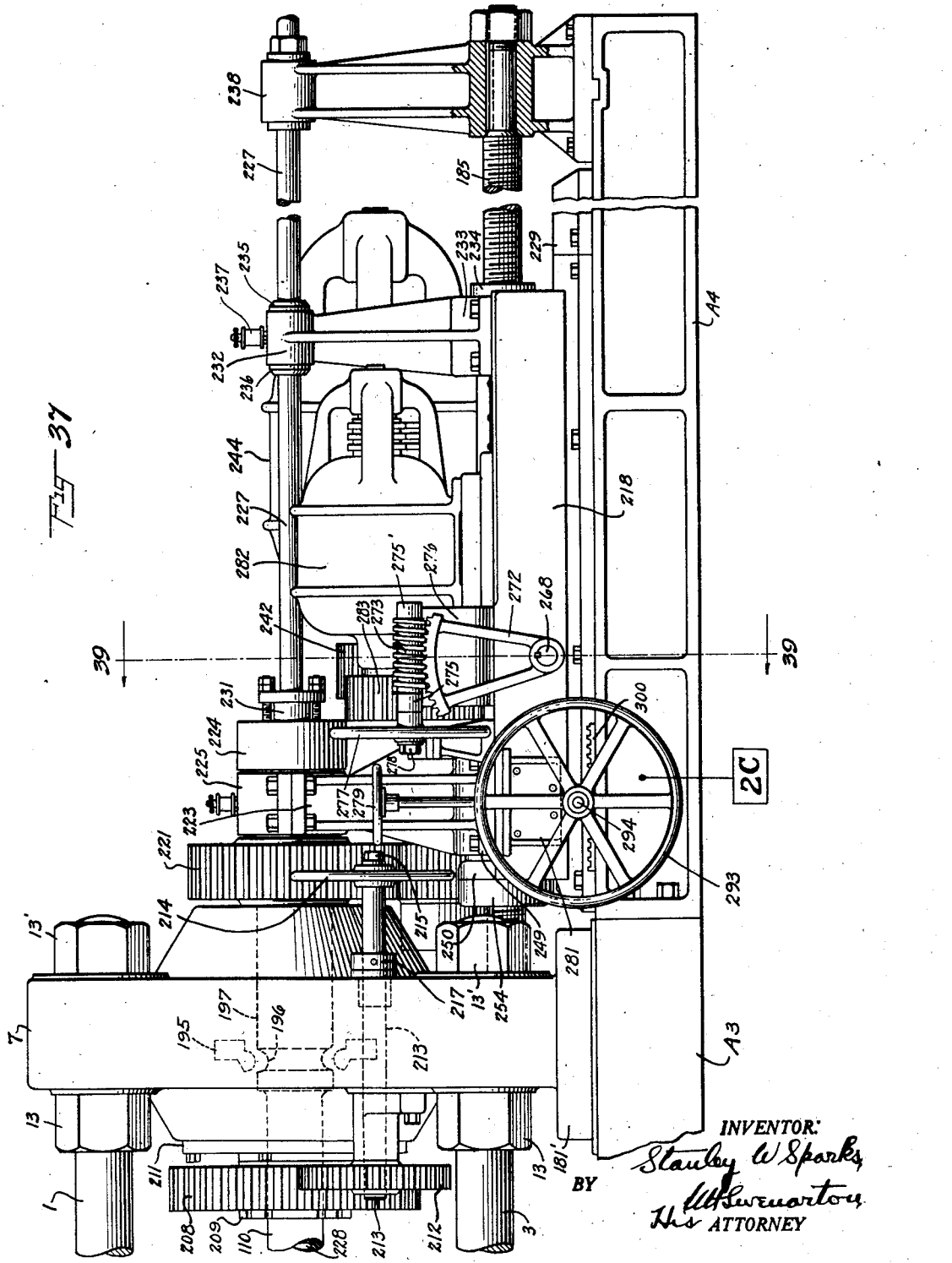

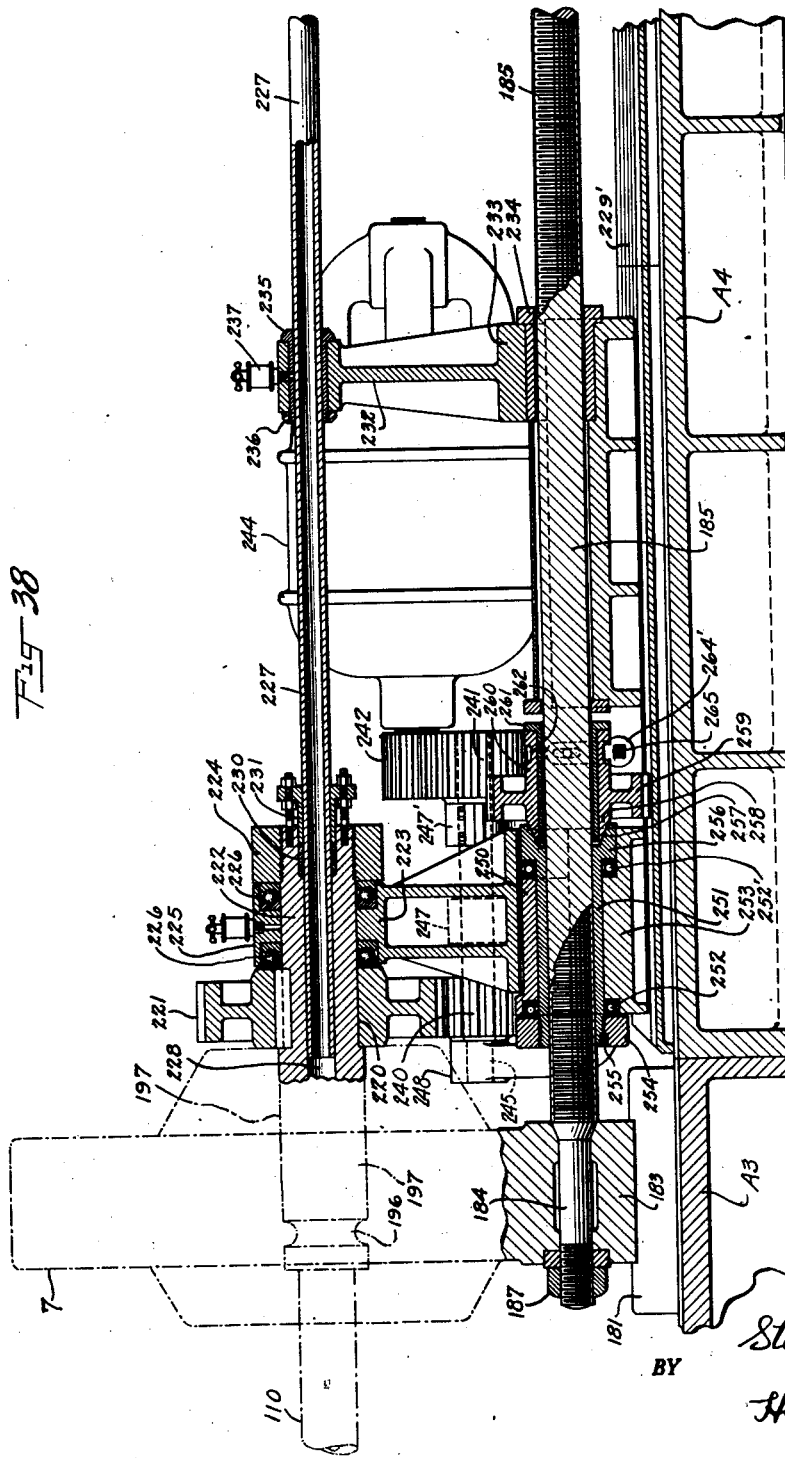

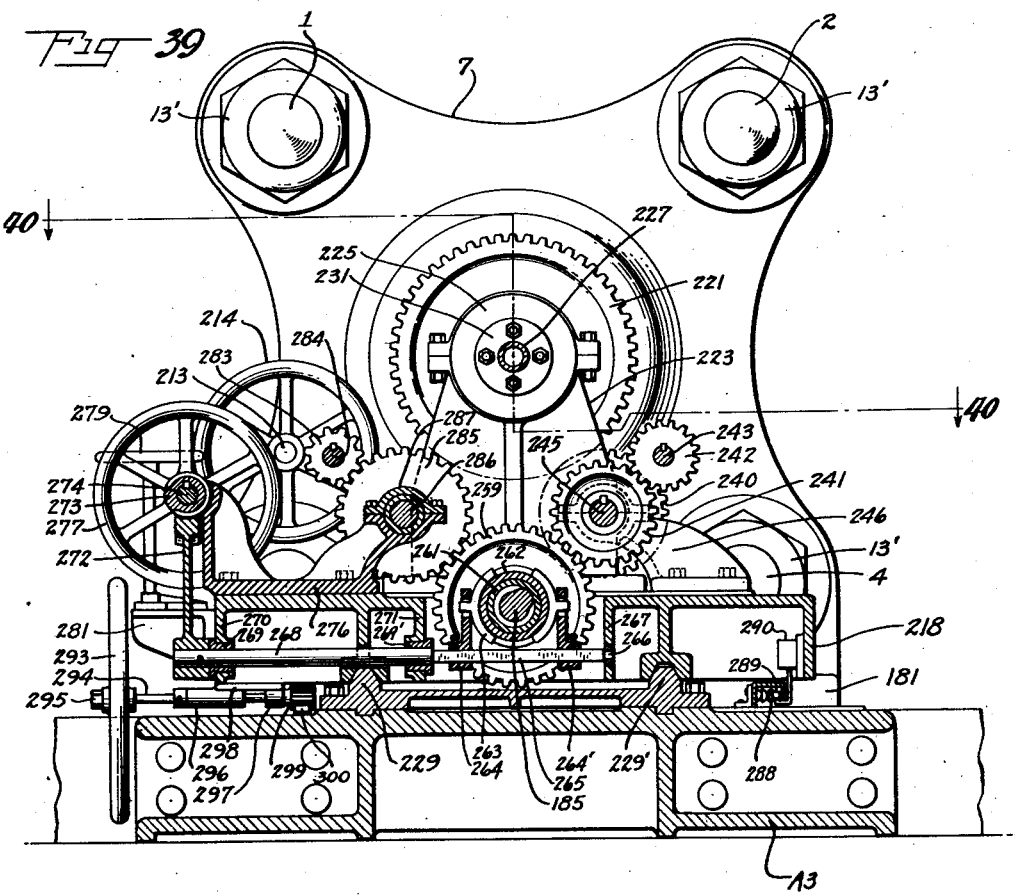

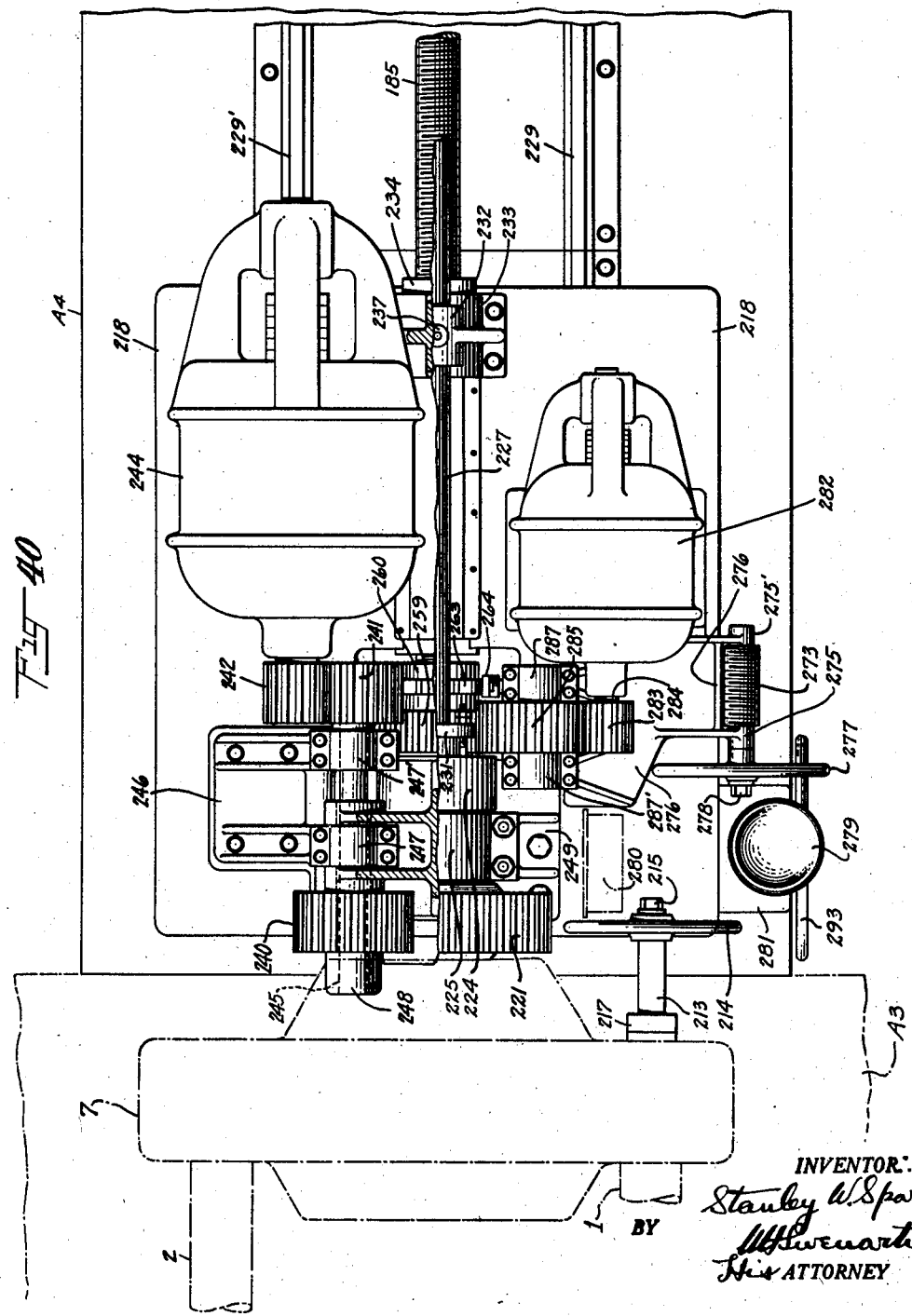

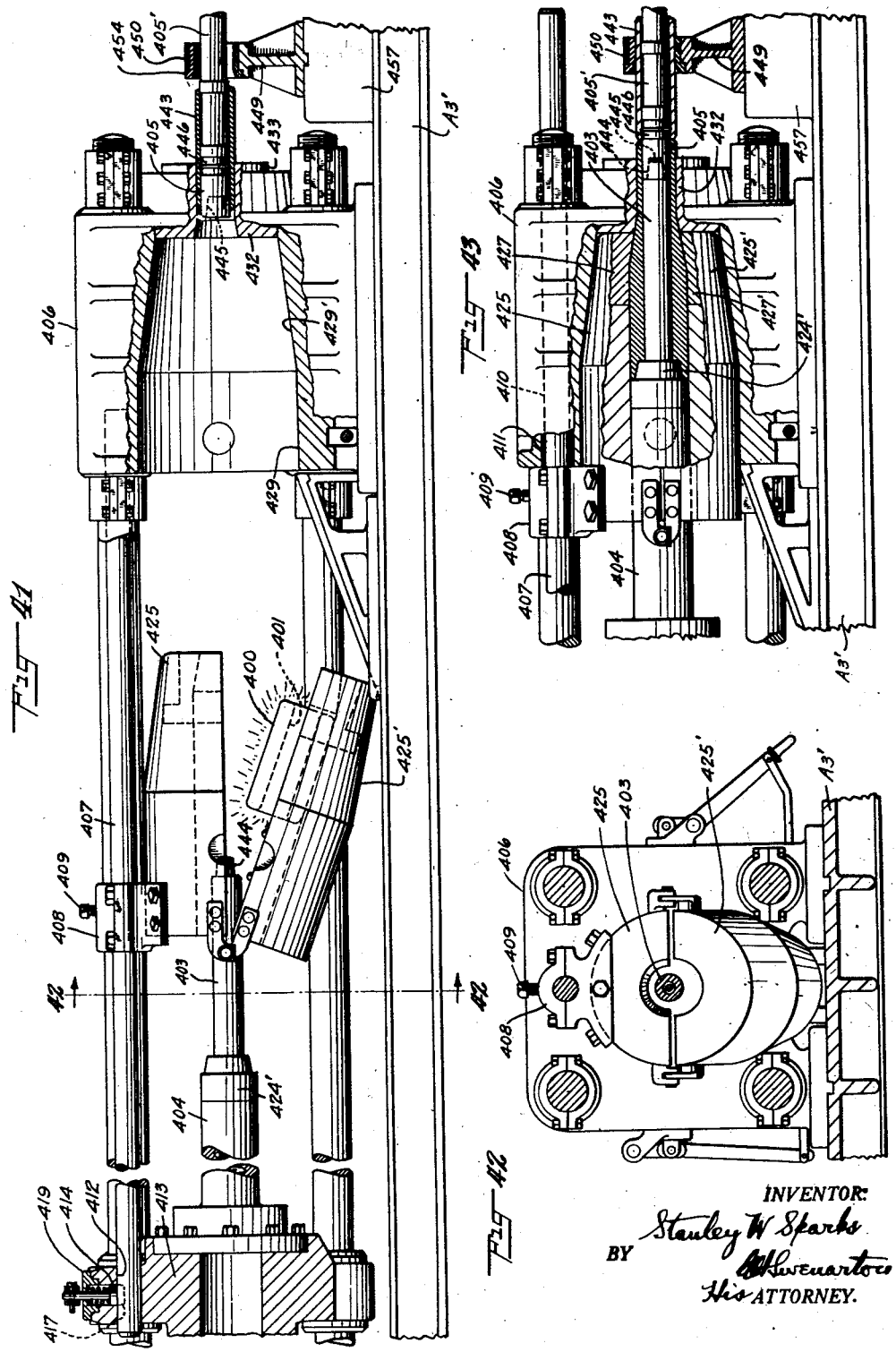

March 28, 1933.  S. W. SPARKS  1,902,975
METHOD OF AND APPARATUS FOR MAKING EXTRUDED SEAMLESS METAL SHAPES
Filed May 11, 1929   27 Sheets-Sheet 25
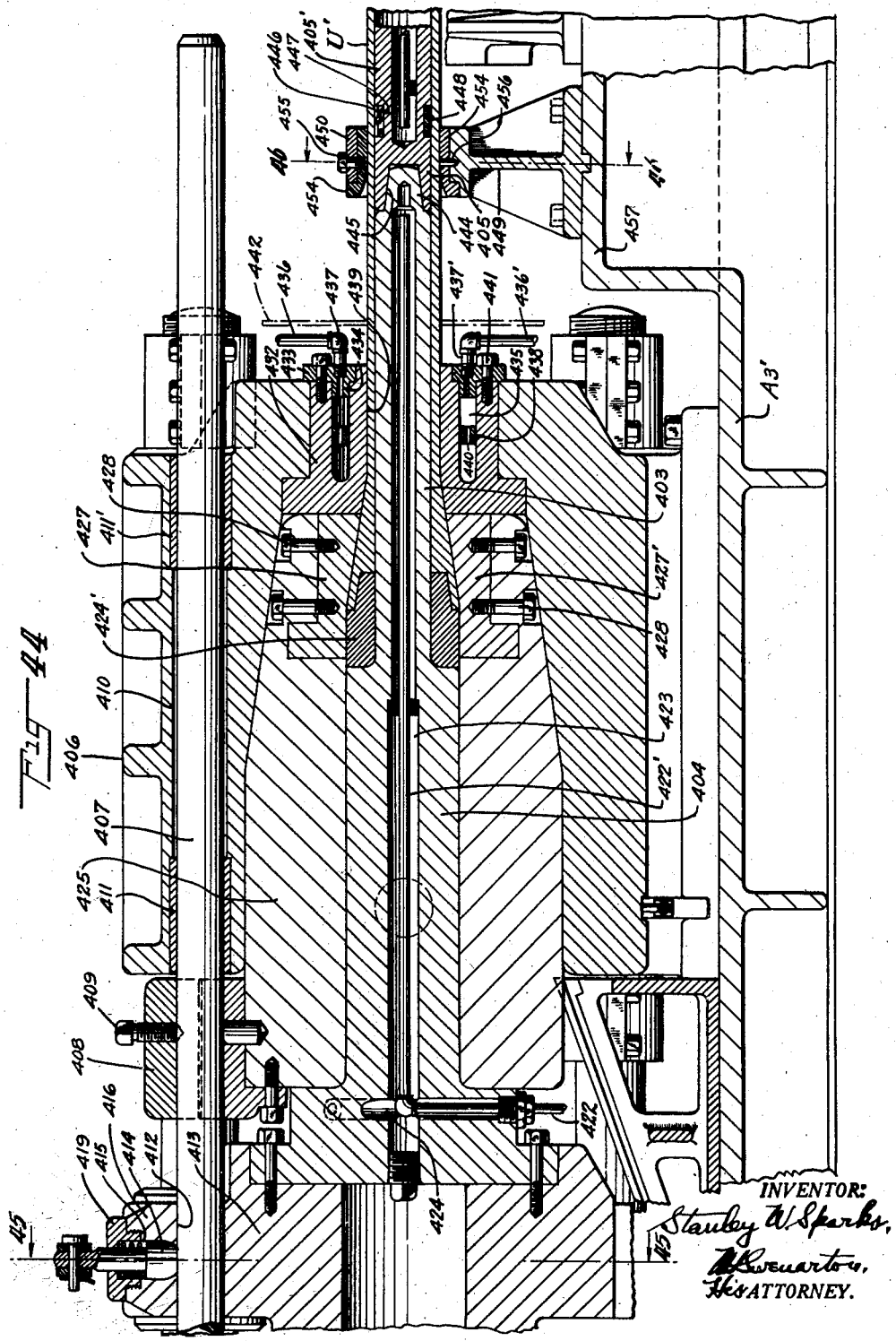
INVENTOR:
Stanley W. Sparks,
His ATTORNEY.

March 28, 1933.  S. W. SPARKS  1,902,975
METHOD OF AND APPARATUS FOR MAKING EXTRUDED SEAMLESS METAL SHAPES
Filed May 11, 1929    27 Sheets-Sheet 26
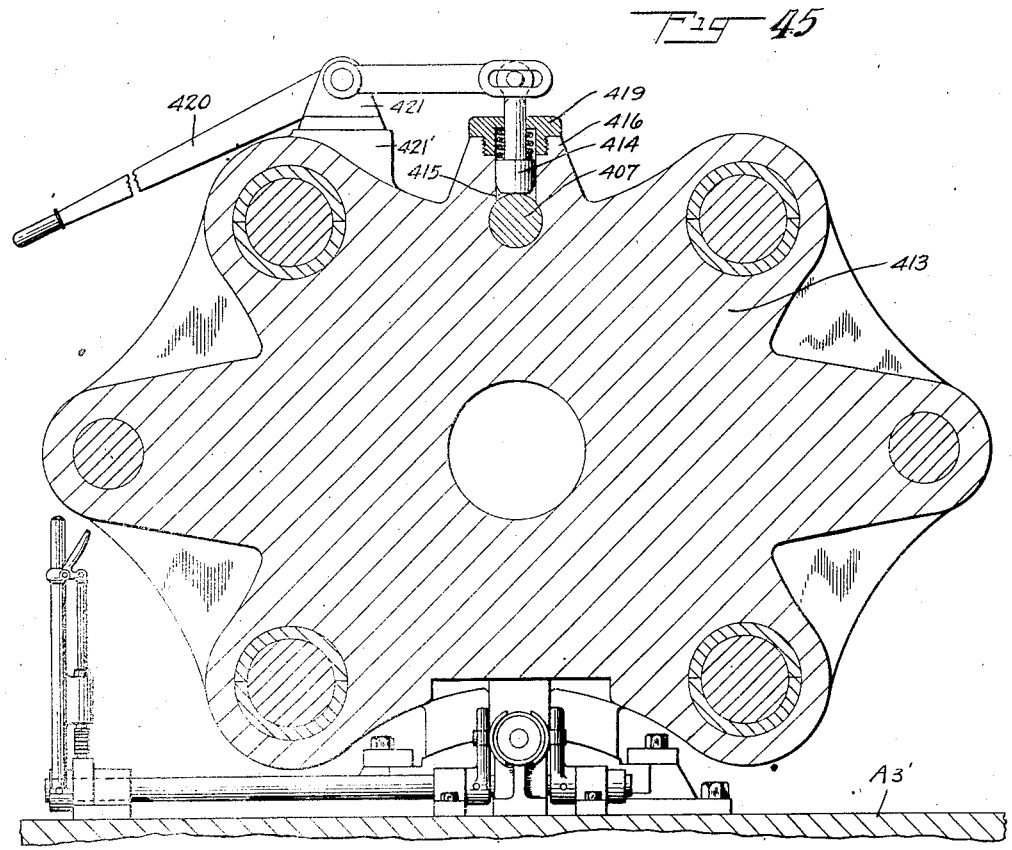
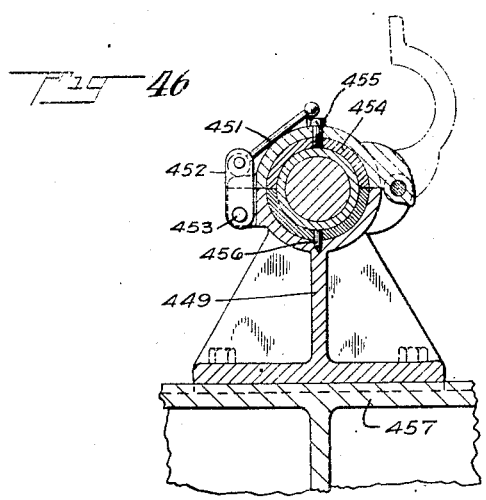
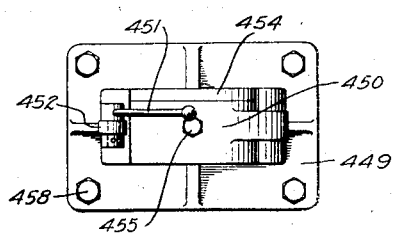
INVENTOR:
Stanley W. Sparks,
BY
His ATTORNEY.

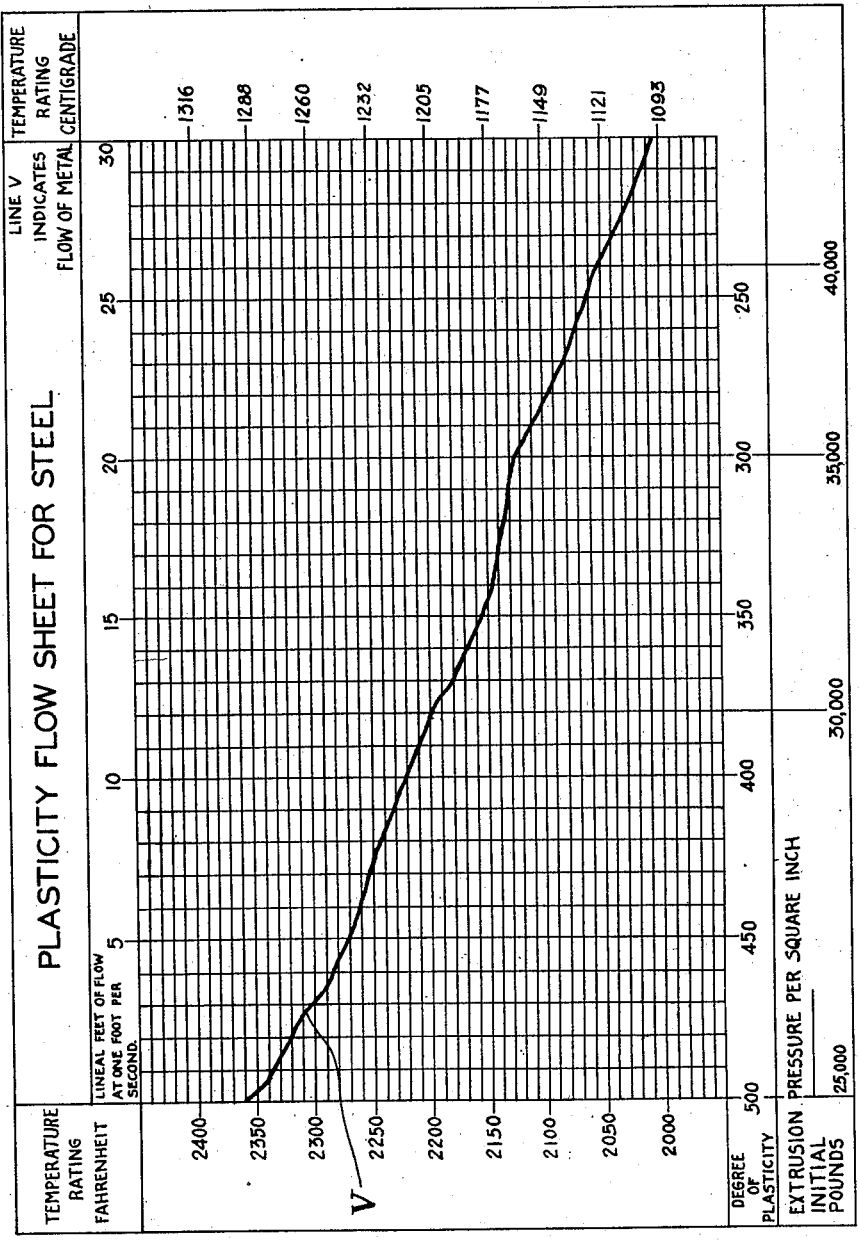

Patented Mar. 28, 1933

1,902,975

UNITED STATES PATENT OFFICE

STANLEY W. SPARKS, OF BROOKLYN, NEW YORK, ASSIGNOR TO CHARLES H. BICKELL, TRUSTEE

METHOD OF AND APPARATUS FOR MAKING EXTRUDED SEAMLESS METAL SHAPES

Application filed May 11, 1929. Serial No. 362,255.

My invention relates to the high speed production of seamless steel or wrought iron tubing or tubular shapes, by the extrusion process using a specially constructed, fully self contained, power operated, mechanical apparatus, attached to a series of bed plates, which when in operating position are anchored to heavy concrete foundations, with proper allowances in construction for the expansion of the machine when it is in operation. The major units of the apparatus have a universal application to the rapid production of commercial seamless tubing, of all standard or special lengths and sizes.

The quickly applied, positive mechanical movements, incorporated therein, permit the rapid production of tubular shapes accurately concentric, smooth in outside and inside finish, while the texture of the metal blank used is made more homogeneous, and the physical properties of same are greatly improved during the process of being extruded. The nubbin or crop end is left in the dies after the tube has been extruded, and it is that part of the metal blank or ingot that is unfitted for use in commercial tubing when operating on ferrous metals such as steel ingots.

Speed and rapidity of the mechanical operation are the prime factors in the successful operation of this apparatus, as the essential elements of plasticity cannot be maintained and successfully used in the heated blank excepting through the rapid operation of the mechanical parts and the rapidly applied progressively increased pressures to the blank in order to maintain a uniform flow of the metal through the dies and around the form'ng arbor, in accordance with the flow sheet diagram.

The many movements of the inter-connected parts of the machine are accurately timed, completely synchronized and in the full control of the three operators, one stationed at the main control station and one at each sub-station, and the controlling mechanism at each station is conveniently located for rapid operation. A complete cycle of the extrusion operation occurs within the period of about 1 minute and 37 seconds, while processing into a 6" tube a metal blank weighing approximately 625 lbs., which time includes the mechanical means for the recovery of the finished tube.

One of the features of my invention is the provision of a complete mechanical unit composed of a combination of accurately timed power movements, which through a series of inter-connected sub-units will process, by extrusion, a solid or cored metal blank (either an ingot or a billet) in one continuous operation and in one heat into an accurately finished tubular shape, at a low labor cost without manual operation other than manipulation of controls, while using a cheap base material and without the necessity of preforming or otherwise preparing the base material before it is processed.

The advantages claimed in my improved method and apparatus for the production of seamless tubing are quickly apparent when a comparative study is made of the present methods employed in the manufacture of seamless steel tubing. One of the more favorably known processes of making seamless steel tubing is a so-called automatic rotary process which involves an elaborate series of preliminary and finishing operations. In such a process an ingot is first rolled into square blooms then, in order to remove the inherent surface defects of these blooms, an expensive chipping operation is performed on the bloom before it is rolled into round lengths and cut into billets, which latter are of the same weight and cubical content as the finished tube. These billets are then reheated and subjected to a plurality of piercing, expanding, reeling and finishing operations which require expensive mill equipment and high operating-cost machinery.

Many progressive seamless steel tubing manufacturers now employ every known safeguard in the preparation of the material for processing, including the employment of specially prepared open-hearth or electric steel ingots, but the defects in the base material used in these processes cannot be wholly eliminated even when subjected to the most rigid inspection so that they will not appear later in the finished tube and sometimes at a point on the inside of the tube where they cannot be easily discerned. In the aforesaid automatic rotary process even the large area of reduction and extensive elongation which occurs in completing a finished tube, all of which is accomplished by rolling, piercing, expanding and reeling operations, are insufficient to furnish and effectively insure against inherent steel defects such as blow-holes, slivers, cracks, etc. Furthermore in the piercing operation employed in such process, the billet is subjected to violent torsional and expansional strains which tends to open up the defective spots in the structure of the metal while the same is at a rolling or piercing temperature and these defects persist in spite of the expectation that subsequent operations will eliminate them. Moreover, in none of the operations so employed is there more than a superficial change in the texture of the steel from its original form in the cast ingot, therefore, if the ingot had any defects they will inevitably appear in some form or other in the finished product. In addition to the foregoing operations of rolling, piercing, expanding and reeling the resultant tube is finally submitted to a series of straightening operations which also require further time and expensive equipment.

In the production of welded wrought iron pipe, it is at present customary to resort to a welding operation on a lapped joint and as a consequence not only is the texture of the pipe non-homogeneous but such pipe does not meet the rigid requirements of many industries where only an extremely small tolerance in the wall thickness of the pipe is permitted by the rigid and exact specifications employed in such industries.

As is well known, ordinary steel contains more carbon than wrought iron although some mild steels contain equally as little. This carbon is present largely in the form of so-called pearlite, that derives its name from its scaly or plate-like formation which gives a display of color somewhat resembling mother of pearl. Except for the presence of slag (iron silicate), wrought iron and mild or low carbon steels are almost identical in their chemical composition and physical properties. As a consequence of the close resemblance between wrought iron and steel both of these materials are especially adapted for employment in my improved process for the extrusion of tubular shapes as herein set forth.

In processing or forming steel tubes by extrusion in accordance with my invention, a blank comprising either a cast steel ingot or billet, either square or round in shape and with the usual taper, is employed and such blank will have the approximate weight of the finished tube except the proper allowance for the nubbin or crop end, which nubbin contains material not suitable to extrusion flow and which is otherwise unfitted for use in the production of high quality seamless tubing. Among the advantages of my invention are the following:

1. There is no necessity for employing expensive electric or open-hearth ingots or for the preparatory treatment of the blank, other than the heating of the same to the proper extrusion temperature and the heated blank is quickly introduced into the extrusion machine, wherein it is processed, whereby the expensive reforming, rolling or otherwise preparing of the blank as is now common practice is entirely eliminated.

2. By the quick introduction of the heated blank into the closed die, the same is protected against undue cooling and the access of air, with the consequence that the oxidation thereof and the formation of scale on the surface of the heated metal, both before and during the subsequent extrusion operation, is largely inhibited or retarded, so that when the high extrusion pressures are applied to the heated metal, it quickly and without retardation flows through the die along the definite flow lines thereof.

3. While the pressure is being applied to the billet, a definite molecular change takes place and the violent movement and working and kneading of the plastic metal before it is forced through a restricted annular orifice, and over and around the forming end of the arbor, causes the molecules, while in motion and under high pressure, to rearranged themselves, and form a homogeneous mass, as the metal cools off in the forming section of the dies, and consequently during such rearrangement the defects or any extraneous refractory material that is in the structure of the metal is entirely eliminated from the resultant tube.

4. Again after the molecular rearrangement is accomplished as aforesaid, there are no further serious torsional or expansional strains on the metal as it flows through the straight forming-section of the dies and the metal is not at any time expanded beyond its elastic limits at the lower temperatures which prevail during the actual extrusion and with the consequence that no fissures or cracks can occur in the metal structure of the extruded tube.

5. As quickly as the extruded metal reaches the water cooled section of the forming-die, it loses its plasticity quickly, sets into its proper shape as it travels outwardly over the arbor and after the tube is cut off from the nubbin and the arbor is withdrawn, it requires no further strengthening operation.

6. As a result of all these fundamental differences between the principles governing even one of the most modern methods of manufacturing commercial seamless tubing and my invention, it is possible through the employment of my invention to effect a very substantial saving in the cost of material used, in the first cost for equipment and labor cost to operate a compact self-contained, tube extrusion machine, such as hereinafter set forth, as compared with the cost of equipment and operating a large tube mill and, lastly, there is a very substantial economy in floor space and the power required to operate my extrusion machine due to the concentration of the operations into a single heating and a single extrusion operation and the fact that the major portion of the power used directly effects the flow of the metal into the finished shape.

In the accompanying drawings in which I have illustrated certain preferred embodiments of a tube extrusion machine for the production of either steel or wrought iron pipe, or other tubular shapes in accordance with my invention:

Fig. 1 is a longitudinal diagrammatic view of an apparatus suitable for the production of seamless tubing in accordance with my invention, the split die thereof being shown in an open position and the metal blank in a position ready to be processed;

Fig. 2 is a diagrammatic view similar to Fig. 1 except that the die is shown in a closed position, the extrusion having been completed and the arbor or forming-mandrel having been withdrawn from the finished tube;

Fig. 3 is a longitudinal elevation of a solid, cylindrical metal blank from which the tube is made;

Fig. 4 is a side elevation, partly in section, of the completed extruded tube;

Fig. 5 is a longitudinal side elevation of the hydraulic power cylinder, one of the steam draw-back or traverse cylinders, and of the rear section of the sliding cross-head, part of the power controlling mechanism being also illustrated;

Fig. 6 is an end view on section line 6—6 of Fig. 5, the hydraulic and two steam cylinders being shown in elevation; and the tie rods and hydraulic plunger being shown and a part of the power controlling mechanism being also illustrated;

Fig. 7 is a plan view of the construction shown in Fig. 5, showing the location of hydraulic cylinder between the two steam cylinders, also showing the valve controlling mechanism and the rear end section of the sliding crosshead;

Fig. 8 is a front elevation of the rear end of the cross-head on section line 8—8 of Fig. 10 showing a cross section of tie rods, steam piston rods, hydraulic plunger, crosshead slide, gibs, and a part cross section of base plate;

Fig. 9 is a perspective view of the split die incline;

Fig. 10 is a longitudinal broken view in elevation of the crosshead, tie rods, steam piston rods and controlling levers mounted on bed plate at the main control station, also plunger clutch wheel, front end section of the die-pot with the split-die locked therein showing the cross-head and the extrusion ram at the end of its forward stroke;

Fig. 11 is a longitudinal vertical section of the crosshead showing a section of the hydraulic ram in elevation, fragmentary section of the flanged end of the extrusion ram, a vertical section of die-incline and the bed plate;

Fig. 12 is a front view, partly in elevation and partly in section, taken on the line 12—12 of Fig. 11;

Fig. 13 is a section on line 13—13 of Fig. 10 showing power controlling mechanism at the main control station, a cross section of the tie rods, hydraulic ram and bed plate;

Fig. 14 is a fragmentary side elevation, partly in section of front end of crosshead, the split-die, the die-block and the front end of forming arbor the split dies being shown in an open position with the blank in place ready to be enclosed therein;

Fig. 15 is a view similar to Fig. 14, but showing the split die advanced and locked within die-block with the blank in position ready to be processed;

Fig. 16 is a fragmentary, longitudinal, vertical section of the crosshead, the split-die and the die-block, showing the ram and arbor in the respective position of these two latter members at the end of the ram extrusion stroke and at the moment of completion of the extrusion operation;

Fig. 17 is a section view on line 17—17 of Fig. 16 showing die incline, extrusion ram, the rods and bed plate, the top die sliding rod bracket, the spring controlled top split-die locking mechanism, and showing the die-block, the locking pin and lever for same, the main split-die locking mechanism (with its levers, brackets, and connecting rod all in elevation);

Fig. 18 is a longitudinal elevation of the split-die, in closed position, and the top die slide-rod bracket and the die hinges;

Fig. 19 is a section on line 19—19 of Fig. 16 showing the rear end of the die-block, the split-die, the ram in a locked position as shown in Fig. 16 and the tie rods, but the die-locking pins, locking levers and connecting rod being shown in elevation;

Fig. 20 is an enlarged fragmentary section on line 20—20 of Fig. 19;

Fig. 21 is a fragmentary, longitudinal vertical section, partly diagrammatic, of the forming arbor, forming die and die-block with the heated plastic material therein and the arbor being shown in its initial position prior to the flow of the metal thru the opening in the die with the follower (shown in section) in position therein;

Fig. 22 is a view in longitudinal elevation of modified form of a spirally grooved, forming plug;

Fig. 23 is an enlarged perspective of split guide ring;

Fig. 24 is a view similar to Fig. 21, but at a later stage in the extrusion operation when the metal has commenced to flow through the opening in the mouth of the forming-die, and showing the manner in which the tube is held in center alignment by top guide shoes and bottom roller guides;

Fig. 25 is a transverse, vertical section on line 25—25 of Fig. 26 showing more particularly the die-block, one of the top guide domes and brackets, one of the lower roller guide boxes, the cut-off saw, its sliding carriage, its base, idler and motor, with a fragmentary section of the tube recovery rack;

Fig. 26 is a fragmentary, longitudinal elevation, partially broken away, of the lower guide box, the upper guides and the completely extruded tube, showing the cut-off saw in a severing position;

Fig. 27 is a fragmentary plan view of the construction shown in Fig. 26 to the left of line 25—25, showing the finished extruded tube in the machine and a fragmentary plan view of finished tubes on a recovery rack;

Fig. 28 is a plan view of a lower roller guide box;

Fig. 29 is an end view of Fig. 28;

Fig. 30 is a transverse vertical section on line 30—30 of Fig. 28;

Fig. 31 is a perspective view of V-block of one of the roller guides, showing the rollers in position therein;

Fig. 32 is a fragmentary, longitudinal elevation, partly in section, of the base plate, the traverse carriage lead screw, the rear roller guide box, the finished extruded tube, the follower and the arbor, also the tail-stock, the ball thrust bearing, the arbor locking mechanism and the bed plate;

Fig. 33 is a perspective view of one segment of the arbor segmental locking ring;

Fig. 34 is a view on line 34—34 of Fig. 32 showing the tail stock partly in elevation and partly in section;

Fig. 35 is a front end elevation of a ball thrust bearing cage with the balls in position;

Fig. 36 is a section on line 36—36 of Fig. 35;

Fig. 37 is a longitudinal elevation of the tail-stock, the arbor traverse carriage, and the rear end support of the carriage traverse screw, with lower portion of latter in section showing means of supporting such screw and details of control mechanism at one of the sub-control stations;

Fig. 38 is a fragmentary, vertical center section of the arbor traverse carriage;

Fig. 39 is a vertical section on line 39—39 of Fig. 37 showing arbor traverse carriage and the bed plate;

Fig. 40 is a horizontal section on line 40—40 of Fig. 39;

Fig. 41 is a view, similar to Fig. 14, of a modified form of the split-die support and locking means, extrusion ram, die pot, forming arbor and arbor support and hollow blank in position in die;

Fig. 42 is a vertical section on a line 42—42 of Fig. 41;

Fig. 43 is an elevation generally corresponding to Fig. 42; but with the parts thereof in the position assumed at an intermediate point of the extrusion operation and showing the ram in positive central engagement with the arbor;

Fig. 44 is an enlarged view, similar to Fig. 16 of the modified form shown in Fig. 41, but with the parts thereof shown in the positions assumed at the end of the ram extrusion stroke, and at the moment of the completion of the extrusion operation;

Fig. 45 is a section on line of 45—45 of Fig. 44;

Fig. 46 is a vertical section on line 46—46 of Fig. 44;

Fig. 47 is a plan view of modified arbor and the tube guide-block;

Fig. 48 is a plasticity metal flow sheet showing velocity of flow of steel at varying temperatures and while varying extrusion pressures are being applied thereto;

Referring more particularly to Figs. 1 to 40 of the drawings and the general construction of the apparatus shown therein, Figs. 1 and 2 show a fully self-contained, power driven mechanism, mounted on a series of connected base plates designated A1, A2, A3, A4 and to which are attached a number of sub-assemblies of the functional mechanism. These parts are all connected in proper relation to each other by four heavy machine steel tie rods 1, 2, 3, and 4 respectively which extend thru and hold firmly in place the hydraulic cylinder 5, the die-block 6 and the tail stock 7, all of which are further held in their proper position by being firmly attached to the aforesaid four sections of the bed plates by suitable cap bolts.

The portions of the tie rods between the front end of hydraulic cylinder housing and the open end of the die-block 6 serves as guides for the cross head 8 which is slidably mounted thereon and reciprocates as the power of the two steam cylinder 9, 9′ and the aforesaid hydraulic cylinder 5 are applied thereto to move the split die, comprising upper and lower member 10, 10′, along the slide B in and out of the die-block 6 as well as to periodically advance and retract the extrusion ram 11.

The fixed or anchored parts, such as the hydraulic cylinder block 5, the die-block 6 and the tail stock 7, are held firmly in their respective positions on the tie-rods by buttress threaded split nuts 12 which take the power thrust in both directions of the sliding cross head 8 and its attached or interlocking parts. The tail stock, being attached to the hydraulic cylinder and die block by the said tie rods (the latter being slightly reduced in diameter) is held in perfect alignment by same and the pressure applied thru the arbor to the ball bearing thrust mechanism is finally taken on buttress threaded nuts 13, 13' which are screwed tightly on both sides against the tail stock 7.

All of the above fixed or anchored pressure members are fitted in perfect central alignment on the interconnected bed plate sections by machined tongues on each member fitted into longitudinal machined slots or grooves and securely bolted thereto by heat treated machine steel cap bolts.

The hydraulic cylinder power unit 5 shown in Figs. 5, 6, 7, is mounted on the base plate, the longitudinal and vertical center line of which is parallel to a center line running thru all the connected base plates of the machine. The two steam traverse or drawback cylinders 9, 9' are fitted to the bed plate A1 and mounted one on each side of and parallel to the hydraulic unit, the cylinders being held firmly in their respective positions by being attached to cast iron cradle pedestals 14 which are attached to the main bed plate A1. The longitudinal center lines thru these steam cylinders are the same height from the base as the hydraulic cylinder. The hydraulic plunger and plunger head (not shown) are integral and of standard construction for retaining pressures, and are preferably of forged steel. The hydraulic cylinder which is also preferably of forged steel is closed at the high pressure end and held firmly in place at its ends by heavy cast steel housings 15 into which the cylinder 5 is fitted, the same being held securely together by nuts 12 screwed onto the threaded portions of the tie rods.

The hydraulic stroke control valves 16, 16' are attached to both ends of the cylinder 5 and thru a series of levers and connecting rods are controlled at the main control station as hereafter more fully described. The extension end of the hydraulic plunger is slidably attached to the cross head 8 and adapted to be periodically locked thereto by the operator at main control station MC.

The two steam cylinders, shown in Figs. 5, 6 and 7, are identical in construction and have a standard D-shaped slide valve motion, similar to the valve motion of a steam driven water pump, the stroke being automatically governed by valve cut off arms 17 attached to valve stem 18 and the stroke is regulated and adjusted by adjustable collars 19 fitted to the piston rods 20 and the piston extension rods 21. The valves proper 22, 22' are so arranged as to perfectly regulate the intake, cut-off, expansion and exhaust of the steam in the cylinders and are set with the proper lead to effect a cushion for the steam piston at the end of its stroke. Likewise, the length of the stroke of the pistons can be governed by the slide valves 22, 22'. The live steam entry into both ends of the cylinders 9, 9' is controlled by quick acting, rotating impulse valves 23, 23' fitted to the valves or steam chests 22, 22' located on both ends of steam cylinders. The impulse valves are connected to one universal control lever C (Figs. 10, 13) located at the main control station MC by a series of connecting rods and rocker arms, to be described later, which are manually operated by the operator at the said station.

The front extension end of the piston rods 20 are connected or attached to the outside wings of the front and rear housings of the cross head 8 and are held firmly in position by heavy threaded nuts 24 screwed to the threaded sections of the piston rods 20 thereby taking the thrust of the steam pistons and at the same time holding the cylindrical ribbed body section 25 of the cross head 8 rigidly clamped between the cross-head housings 26, 26'. The steam cylinders are equipped with the usual exhaust lines 27 and valves 28 that lead to a jet or surface condenser (not shown) or direct to the atmosphere.

The sliding cross-head 8 (Figs. 5, 7, 8 and 10 to 16 inclusive) is a built up or assembled unit that reciprocates on the tie rods which also act as guides, and travels between the rear end of the die-block 6 and the front end of the main power unit. Its main structure comprises two heavy cast steel housings 26, 26' located at the respective ends, to which is bolted a cast steel cylindrical ribbed body member 25 which is centrally bored thru its entire length to receive the forward extension end of hydraulic plunger 29 which telescopes therein with a free reciprocating movement (see Fig. 11). The construction of the rear cross head housing is different from the forward one although they both have cylindrical center bosses.

To the rear housing is attached a removable and quickly renewable assembly, comprising the hydraulic plunger locking mechanism which periodically engages and locks the cross head 8 directly to the plunger 29 by the engagement of quadrantly disposed, spring-pressed segments or split ring 30 with a semi-circular grove 31 machined in and around the periphery of forward end of said plunger 29. This sectional ring 30 is locked in position, after its periodic engagement, by an outside coarse pitch, threaded sleeve 32 that engages in corresponding threads machined on the inside of a heavily flanged bushing 33 which is fitted into a hole bored in the rear end housing 26' and is rigidly held in its proper position by cap screws that are fitted into tapped holes in rear face of the housing 26'. The inside section of the threaded sleeve 32 is counter bored on a taper $a$ the angle of which is the same as the angle on the outside tapered portion $a'$ of the split ring 30 so that when the threaded sleeve 32 is moved forward by rotating the sleeve, the tapered bore of same engages the tapered section $a'$ of the ring and holds it tightly and fixedly in the groove 31 of the hydraulic plunger 29, so that when the forward high pressure thrust is applied thereto the line of pressure force moves from the plunger to the ring 30, thence to the straight machined face $b$ in the bottom of the hole in housing 26' and thence thru the assembled parts of sliding cross-head 8 direct to the attached extrusion ram or plunger 11. The outside section of the sleeve 32 is machined to a reduced diameter and to this is fitted and keyed a straight-face spur gear 34 which is rotated by a pinion gear 35 keyed to a longitudinal shaft 36 that is held in position by a cast iron bracket 37 attached to the face of rear housing 26'. The gear drive shaft 36 leads thru machined holes in the rear and forward housings 26, 26' and the rear end thereof is supported by a bracket attached to the forward housing 26. On the forward end of the drive shaft 36 there is fitted and keyed a bevel mitre gear 37 which meshes with a like gear 38 that is keyed to an angularly disposed shaft 39 which rotates in a bearing 40 bolted to the front housing 26. On the upper end of the shaft 39 there is fitted a large spoked handwheel D that is manually operated by the operator at the main control station MC. By rotating the handwheel D in either direction, the operator can freely and rapidly move the plunger locking sleeve 32 into a locked or unlocked position within the locking cylinder 25.

The bottom section of the rear housing 26' is flared forward and rearward from a vertical center line and has longitudinal and cross ribs and flanged wings 40, the flanges being machined on three sides to form a shoe-shaped cross-head slide 41 similar to the well known cross-head slide of a reciprocating engine. This cross-head slide 41 is slidably mounted and attached to a guide 42 mounted on the bed plate and its bottom has a machined guide 43 that fits closely into machined longitudinal grooves or slots in the base plate, being held fixedly in place by cap bolts. On to the top section of the guide member there are attached, one on each side, machine-steel strips 44 running the full length thereof which prevent the cross-head 8 from lifting upwards while reciprocating. These strips are also held in position by cap bolts and are so fitted as to allow a free sliding movement of the cross-head 8 therein, but otherwise they prevent any buckling movement in aforesaid four tie rods and at all portions of the cross-head stroke act as a guide while the high, traverse and thrust pressures are being applied thereto. In Fig. 10 the cross-head 8 is shown in its most advanced position, while in Fig. 11 it is shown locked to the plunger, and in its approximate middle position, and in Fig. 5 it is shown in it rearmost position.

The front hydraulic valve control rod 45 (see Fig. 11) which moves freely in the cored hole in the housing 26' leads to the main control station MC. A cast iron bracket 46 attached by cap bolts to the top of the rear housing 26' (see also Fig. 11) acts as a guide for the steam impulse valve connecting rods 47 and allows a free rotating and reciprocating movement therein.

The cross-head proper comprises the aforesaid cylindrical body 25 which consists of a heavy cast steel member, cylindrical in shape, with four heavy longitudinal ribs quadrantly disposed around its periphery and on each end are identical heavy flanges which are machined and drilled to fit counter-bored holes in the forward and rear housings 26, 26' being attached thereto by heavy cap bolts. The center bore of the cylinder is machined to allow a free telescoping sliding movement of the hydraulic plunger 29 therein, the rear section of this bored hole being counter-bored to receive a machined bronze bushing 49, renewable, and which has a close sliding fit around the hydraulic plunger 29 that keeps the plunger from traveling on other than a perfect central plane. The greatest pressure force is applied to the body of cross-head 8 when in its forward extrusion movement, but ample provision is made in the strength of bolting of the flanges to withstand any drawback pressures that are applied to the cross-head when breaking out the plunger 11 from the nubbin or when breaking out and withdrawing the split-dies 10, 10' from the die-block 6. The forward housing 26 of the cross-head is attached to the cylindrical body section in the same manner as the rear housing 26' and is similar in shape and design, excepting as to the width of its center body section and its lack of the slide or shoe 41 (see Figs. 10, 11 and 13). Its center bottom portion has a cutaway area 50 so that the cross-head on its extreme forward stroke will have clearance to span the split-die incline slide B (see Fig. 11). The top center section of the housing 26 has a hole drilled entirely thru main body which serves as a guide for the top split-die supporting rod. The quadrantly disposed wing sections of the cross-head into which holes are bored to receive tie rods, are fitted with renewable split bronze bushings 51 that are held in place by threaded flange plates 52 which are attached to the machined bosses on the face of the housings 26, 26′ by flat-head screws (not shown) (see Figs. 10, 12 and 13). Both housings 26, 26′ have cross and longitudinal ribs to strengthen these sections when the extreme thrust pressures are applied thereto. The steam piston rods 20 that are securely attached thereto by large nuts also act as bracing members (see Figs. 10, 12 and 13).

The extrusion ram 11 is attached to the front cross-head housing 26 by heavy cap bolts 53 fitted into holes in the flanged base section of the ram 11 and into tapped holes in front face of housing 26 (see Figs. 11, 14, 15 and 16). The ram can be made solid, or if desired can be drilled to be water cooled (hereinafter shown in the modified apparatus). An alternate means of constructing the ram is by fitting on the ends of same a removable extrusion collar (also shown in the modified apparatus) to which the extrusion pressure is applied.

The main control station MC is on the second section of the main bed plate A2 a short distance from the opening in the mouth of the die block 6 (see Figs. 10 and 13). The control levers are mounted in brackets, bolted to the bed plate and are indicated by capital reference letters as follows: the letter E indicates the main hydraulic extrusion throttle lever which is vertically mounted on the main base plate A2 and fitted with a manually operated spring controlled locking pin that cooperates with notched slots in a quadrant attached to the throttle lever bracket 54. The lever E is keyed to the lower shaft 55, to the end of which is attached a keyed arm 56 fitted with a semi-circular shoe 57 that cooperates with a corresponding machined slot in the collar 58 keyed to the longitudinal shaft or connecting rod 59 leading to the three stage hydraulic valves 16, which latter are assembled in one unit and attached to the bed plate A1 near the closed end of the hydraulic cylinder 5. By operating lever E forward by stages progressively increased pressures are applied to the hydraulic plunger during the extrusion stroke and finally a full release of pressure in the cylinder can be obtained immediately by throwing lever E into its most forward position.

Plunger drawback lever F is similar in design to throttle lever E and is keyed to rocker shaft 60 supported in brackets 61. On shaft 60 are keyed the arms 62 carrying semi-circular shoes 63 which cooperate with a groove in the collar 64 fixed on the connecting rod 65 which leads to drawback valves 16′ located on the front of hydraulic cylinder (shown in front elevation in Fig. 6). Lever F allows the operator to quickly introduce hydraulic pressure to the front end of the hydraulic ram head to withdraw the extrusion ram 11 from the nubbin after completion of the extrusion stroke and, in a further movement of lever which rotates the draw-back valve into an exhaust position, releases the accumulated pressure in the forward end of the hydraulic cylinder.

Lever G is similar in design to levers E and F. It is keyed to a rocker shaft 66 mounted on a pedestal 67 which also supports the locking mechanism and is attached to bed plate A2 by bolts. The longitudinal rocker shaft 66 is supported at the other end, near the front end of the steam cylinder, by a pedestal 68 similar in design to pedestal 67. To the latter end of shaft 66 is keyed a rocker arm 69 connected by a reach rod 70 to rocker 71 fitted to central control shaft 47 which, by rocker arm 72 and reach rods 72′ connects to the steam impulse valves 23, 23′ attached to the slide valves 22, 22′ of the steam chests of the steam draw-back and traverse cylinders 9, 9′. By moving the lever G either upwards or downwards from its central or neutral position on the notched quadrant 73, steam is allowed to enter thru the valves 22, 22′ to either the front or back ends of both cylinders 9, 9′. The central position tightly closes the steam from both the steam chests controlled by these valves.

Plunger clutch locking and unlocking hand-wheel D moves into operating position at the main control station MC only when it is required to be operated, which is when the sliding cross-head 8 (Fig. 10) is in its most forward position.

Extrusion ram locking lever H and split-die locking levers J, J′ (see Figs. 10, 17 and 19) are located within the operating radius of control station MC. Lever H is manually operated, having a slotted end section 74. It is attached to a fulcrum bracket 75 which is threaded into the top half 10 of split-die. The lever H is attached to the shank end of locking pin 77 by pins 78 and around the shank end of the pin 77 is fitted a coil spring which cooperates with the large end section of said pin and holds it under tension ready to be projected or forced into a bored hole 79 in the ram. This hole 79 and locking pin 77 are located on an angle of 45° to vertical center line thru the split dies and ram. The hole 79 in the ram 11 corresponds in size to the enlarged end of locking pin 77. When the ram travels backward to the points where it starts its extrusion stroke, the hole 79 in the ram registers with the pin 77 and is immediately locked thereto by the spring forcing the pin into the hole. The split-dies are then traversed backward after the split-die locking pins 80, 81 have been withdrawn by levers J, J′. Levers J, J′ are also part of the controlling mechanism at the main control station MC.

These levers and locking pins are similar in construction and design to the ram locking pin 77, bracket 75, and lever H excepting that they are larger and stronger to withstand the heavy pressures that are applied when the extrusion operation takes place and when the extrusion ram is broken out of the nubbin. The levers J, J' are connected together by connecting rod 82 running thru a cored hole in the bottom of rear section of the die-block 6. The levers are attached respectively to fulcrum brackets 83, 84 which are threaded into bosses 85, 86. The bracket 84 to which lever J is attached has a reversed fulcrum from that of bracket 83 so that when lever J is moved in either direction, both the locking pins 80, 81 move into or out of holes 87, 88 in the split dies coordinately. Levers J and J' have slots 89 to which the shank ends of locking pins 80, 81 are attached. Into the shank ends of the pins are fitted coil springs 90 which act on the enlarged end section of the locking pins in the same manner as the extrusion ram locking pin 77. Lever J has its fulcrum pin 92' at its end instead of the center portion as in lever J.

The split-die is secured by cap bolts to a die-supporting rod bracket 93. A pair of strap hinges 94, 94' is attached to the respective halves 10, 10' of the split-die by cap bolts, the hinge straps being held together by pins 95. The die is fitted with two sets of hinges, the off side set not being shown. In the top section or upper half 10 of die, is a ram locking pin hole 96 and a partially broken away portion of the die shows the relative position of die-registering dowel pins 97, 97' which are threaded into the lower half 10' of the split-die. As the two halves of the split-die move together as they are being advanced forward up the incline slide B into the die-block 6, these dowel pins 97, 97' register and engage with corresponding holes 98, 98' drilled into the upper half 10 of the split-die and thereby serve to hold the two halves of the split-die in perfect alignment while being advanced to the proper extrusion position and before the die is locked into the die-block 6 by the aforesaid levers J and J'.

Fig. 14 shows the split die at the extreme end of its backward movement with the metal blank X resting in the lower half 10' of the die as it rests in turn upon the opposing tracks 99, 99' of the inclined slide B, while the upper half 10 of split-die is supported by the bracket 93 attached thereto and slidably mounted on the supporting bar or rod 101. The front end of the rod 101 is attached and held firmly in position in the top center section of the die-block 6 by a large set screw while the rear end is slidably supported in a bored hole in the front housing 26 of the cross-head 8. The top half 10 of the split-die is further held in a firm position by the ram 11 on which it rests. The two halves 10, 10' of the split-die each have a rear semi-circular, central orifice from which the blank X is extruded and into which the ram 11 is slidably fitted. At the opposite or extreme forward end of the bore of these two halves of the split-die, is a tapered exit orifice which functions as a preliminary die and thru which the metal is first extruded before it enters the forming-die proper 102.

The said split-die is made of special heat-treated, forged die steel and may if desired be fitted with removable die-liners as shown in Figs. 41, 43 and 44 which illustrate a modified form of the invention as hereinafter more fully described.

The die-block or die-pot 6 (see more particularly Figs. 14, 15, 16, 17 and 19) is held in its proper position on the tie rods by heavy split nuts 12 and the side flanges 104 of the base sections are held in alignment on the base plate A2 by tongues which are fitted into longitudinal grooves machined in the base plate. The said flanges 104 are secured to the base plate by heavy cap bolts. The bore 105 in the straight section of the die-block is of a size to have a free sliding fit over the straight turned section of the respective halves 10, 10' of the split-die. The forward section 106 of such bore has a taper slightly sharper than the aforesaid tapered section of the split-die halves 10, 10' in order to form a perfectly tight closure thereof when the split-die is forced to the bottom of the bore of the die-block and locked therein. The extreme front end of the die-block is bored and counter bored to receive the aforesaid removable, flanged die 102 the same being fitted tightly therein by a pressure or force fit and held in its proper position by set screw 107. The die-block 6 is made of special cast die steel and designed to withstand extremely high internal pressures and tension strains while subjected to the high operating temperatures imparted to it from the heat of the blank X.

The arbor 110 (see more particularly Figs. 14, 15, 16, 21 and 24) and forming plug 111 are shown in a position ready to receive the extruded metal of blank X as it is forced over same. The follower 112 holds the arbor 110 in a central position in the mouth of the forming-die 102 before and while the metal in blank X is being forced thru the die and around the arbor and said metal in turn forces the follower 112 out of engagement with its split friction collar 113 which is loosely attached to arbor 110 and held in place by shoulders 113'. The arbor is centrally bored to admit of cooling water being circulated there-thru, the same escaping as steam thru the aperture 114. In Fig. 24 the metal is shown passing thru the dies and out over the arbor in the form of a tube U preceded by follower 112. The tube U is held in perfect alignment and is supported top and bottom by guides 115, 115' the same being indicated diagramatically in Figs. 21 and 24 and being more fully described hereinafter. In Fig. 16 the arbor is shown retracted from the fully formed tube U. The arbor 110 shown in Fig. 22 is provided with a modified form of plug 111' around which are cut spiral grooves to assist the arbor in boring its way into the heated metal when same is being forced around arbor 110. A split ring 113 is provided with a central bead 117 that serves to engage with the groove 118 in the follower 112 when the arbor 110 has been fully withdrawn from the tube U and when follower has been stripped from the tube by contact on the front face of the aforesaid tail-stock 7. The bead 117 and groove 118 due to frictional engagement serve to return the follower 112 into the mouth of the die 102 thus insuring the centering the arbor 110 on its return stroke.

A high speed, motor driven, hot, cut-off saw 120 is attached to the saw arbor 121 which is mounted in bearings 122, 122' said bearings being an integral part of a reciprocating carriage 123. The carriage is slidably attached to the saw base 124 which is bolted to bed plate A2. A motor 125 which is mounted on the carriage 123 in the usual manner, drives the saw thru a belt-drive as shown. The sliding carriage 123 is traversed backwards and forwards during the cutting off of the tube U by a traverse screw 126 cooperating with a nut 127 attached by cap bolts to the central under portion of the carriage 123. The traverse screw 126 extends thru an opening in lower guide box 128a and is supported in a bearing 129 carried by said box. To the screw 126 is attached a hand-wheel 139 which is conveniently located for the operator at control station 2C.

The lower roller guide box 128a, as shown, is mounted on the raised box section 130 of the bed plate A2. This raised section 130 extends longitudinally along the bed plates A2 and A3 between die-block 6 and tail-stock 7 and the three other lower roller guide boxes 128b, 128c, and 128d respectively are attached by cap bolts to the section and held in longitudinal alignment thereon by tongues machined on guide boxes which fit in grooves machined in said bed section 130.

In Fig. 25 the end of the follower 112 is shown entering the guide box 128a (preceding the tube U) being supported on the top by guide shoes 131, twelve of such shoes extending longitudinally, above the aforesaid four lower guide boxes, between the said diepot and the said tail-stock.

The units of the top guide-operating shoes 131 are fully contained in cast iron cylinders 132 mounted on and connected to cast steel beam supports 133, 133' which are integrally joined together by central longitudinal box section beam 134 in the middle of which is a cast boss 135 to which is bolted one of the cylinders 132. The cross beams 133, 133' are attached and held firmly in their proper positions by being clamped tightly to both top tie-rods 1 and 2 by means of compression caps 136 which have a tight compression fit thereon and held firmly together by a sufficient number of cap screws. These cylinders 132 and the lower guide boxes are more fully described later in connection with Figs. 26, 27, 28, 29, 30 and 31.

The second control station 2C is located on top of the second bed plate section A2 at the forward end of the die-block 6 and along side of a tube recovery rack 140. The operator at this sub-station manipulates a tube ejector lever K, the upper guide shoe elevating lever N, the cut-off saw hand-wheel 139 and the saw motor switch and rheostat control panel 141. Said tube ejector lever K is keyed to a longitudinal shaft 143 and held in position by a set screw 144. This shaft 143 extends in front of and parallel to all the lower guide roller boxes and is supported by integral brackets or bosses 145 attached to each of the four guide boxes enumerated above. Three ejector arms are also mounted on shaft 143 the first one nearest the control station 2C being indicated by numeral 146 and the latter two arms, not being shown, but being identical in design therewith. These arms extend inwardly from shaft 143 and thence under arbor 110 and tube U (when latter is extruded). The outward end of arm 146 has a hook section 146' of the same radius as tube U, said hook section engaging with said tube when lever K is depressed by the operator at which time the three ejector arms simultaneously raise tube U from the lower guides and eject same upon the inclined section of the recovery rack 140. The three ejector arms are positioned on the shaft 143 so that there is one arm each between the first and second guide box, the second and third and the third and fourth respectively, thus insuring support for the tube U at three points while it is being ejected from the guide boxes. Arms 146 are held tightly on shaft 143 by set screws. The manually operated top guide elevating-lever N simultaneously raises out of and lowers into position all twelve identical guide shoes 131 (only five being shown). The elevating lever N is held in a fixed upward or lowered position by a spring-controlled, latch pin 147 (shown in plan in Fig. 27) cooperating in a notched quadrant 147' that is bolted to a pad cast on the front under side of cross beam 133. Lever N is keyed to a shaft 148, held in position by a set screw, and longitudinally supported in pedestal brackets 149, 149' (the other supports, which are similar, not being shown) which are cast to the top section of the cross beam 133. The lateral thrust of shaft 148 is taken on two set collars 150 fitted to each end thereof (only one of said collars being shown).

To shaft 148 are fitted twelve identical forked arms 151 (only three being shown, see Fig. 27). These arms are held in their proper position on shaft 148 by set screws. The opposing prongs on each of the forked arms 151 are provided with slots 152 which engage with pins 153, the latter being threaded into a sliding bushing 154 (see Fig. 26) which reciprocates respectively in a bored hole in the cylinder 132 carrying each particular bushing. Vertical shafts 155 are slidably fitted into each bushing 154, each shaft being supported in a bored hole in the dome section of a cylinder 132. To the bottom of each shaft 155 is attached a guide shoe 131 which is secured tightly thereto by threads and a lock nut 156. In the middle section of each shaft 155 there is fitted a collar 157 fixed thereon by a taper pin, and such shaft is prevented from rotating by a splined key 158 fitted into a keyway in the dome section of a cylinder 132 (see Fig. 27).

On the bottom of each cylinder 132 and below the flange thereof is a depending boss 159 fitted into a bored hole in the center boss 135 of a cross beam 133. The cylinders 132 are all held firmly in their proper position by cap bolts as shown.

As the elevating lever N is depressed or moved into a downward position, it rotates shaft 148 and simultaneously rocks the forked arms 151 upwardly, the latter cooperating with the pins 153 to raise the respective cooperating bushings 154. The pins 65 move freely in slots 160 machined in the side walls of cylinders 132. The bushings 154 in moving upward engage with collars 157 pinned to shaft 155 on which the guide shoes 131 are attached. When the above cooperating parts reach the end of their vertical movement they are locked into position by locking pins 147 on lever N. This position allows the free passage of the tube U under all guide shoes when said tube is being ejected from the lower guide boxes. The coil springs 161 fitted around each of the shafts 155 are for the purpose of giving a resiliency to the guide shoes while the extruded tube U is passing thereunder and to compensate for any unevenness in tube, the tension of the springs of the top guides together with the upward tension of the lower roller guide springs being sufficient to hold the tube U in a straight and central position during its extrusion over and around arbor 110.

The lower guide boxes 128a have raised apertured ridge sections 162 into the apertures of which are fitted threaded sleeves 163, said sleeves being adjustable as to height and capable of being locked into position by lock nut 164. By the adjustment of each sleeve 163, upwardly or downwardly, the tension of the spiral coil springs 165 engaging the same can be either reduced or increased as desired. Each of the springs 165 surrounds a stud shaft 166 carried by one of the sliding guide blocks 167 and abuts on one of said blocks and on a sleeve 163 respectively.

The guide block 167, illustrated in detail in Fig. 31, is one of eight such blocks fitted into each of the four guide boxes 128a attached to bed sections A1 and A2. These guide blocks 167 are preferably of cast iron, being cored to reduce their weight, and at the front and back thereof are grooves 168 which, as cast therein, allow any scale or dirt to shift thru and below the same thus keeping the operating surface of each block clean.

Into each guide block and at an angle of 45° are drilled two partial holes 169, 169' which are parallel with the crowns 170, 170' of the 30° inverted V-guideways 171, 171'. The spirally grooved rollers 172, 172' of each such guide block are fitted to freely rotate in holes 169, 169', which are drilled in such a manner that only three-quarters of the diameter of the hole is actually in each block 167. Thus when rollers 172, 172' are fitted therein, one quarter of the surface of such rollers extends outwardly beyond the crown of the inverted guideway 171. As tube U passes over rollers 172, 172' in contact with the spiral grooves thereof, they rotate freely because of the frictional engagement of the tube therewith. In order that the upward movement of the guide block 167 may be limited to a full upward supporting contact with the tube U only, stop pins 173 are fitted into each of seven guide box partitions 174, which latter serve to sub-divide each box into eight similar rectangular compartments 175, the said pins 173 preventing a further upward accidental movement of the guide block. Each of said guide boxes 128a, etc. are bolted to the raised base section 130 by cap screws and are held in proper alignment by means of a tongue and groove connection as shown. The partitions 174 have a cut away, V-shaped recess in their upper edge to clear the tube as the latter, while being supported by the rollers 172, 172' passes along the same.

The thirty-two guide blocks 167, each having two angularly positioned, spiral grooved, hollow, heat-treated steel rollers 172, 172' therein forms a perfectly balanced upward support for the extruded tube U by reason of the adjustable tension that can be placed thereon by springs 82. These rollers 172, 172' in cooperation with the upper shoes 131 distribute the weight of the tube U as it travels over the rollers 172, 172'.

The tail-stock 7 (see Figs. 32, 34) is a heavy cast steel member, the center portion 180, of which, is a heavily ribbed, hollow section having base flanges 181, 181' by which it is bolted to bed plate A3. Said tail-stock and its attached parts are tightly secured to die-block 6 by the four heavy tie-rods 1, 2, 3 and 4 which also rigidly connect the die-block 6 to the hydraulic power unit 5. Thus the extrusion power thrust load is equally divided against the two members 6 and 7. The extrusion thrust load applied to the forming plug 111 of the arbor 110 is transmitted thru the arbor, to the tail-stock 7 by means of an arbor-locking mechanism (hereinafter more fully described). This thrust is then transmitted to the four heavy buttress threaded nuts 13' carried by the said tie-rods, the latter being carried in the wing sections of the center ribbed portion of the tail-stock. In order to keep the tie-rods taut and yet adjustable, due to stretch of same, jam or lock nuts 13, identical to the buttress threaded nuts 13' are fitted on tie-rods and tightened against raised faces on the front side of the tail-stock. Thus the tail-stock is held firmly in its proper longitudinal position. The tail-stock, its locking and thrust mechanism, the tie rods and bolting construction in this size machine are designed to withstand a total longitudinal thrust pressure of some 950 tons, which is ample to provide a safety factor of 2.

The eight cap bolts, four of which are used to hold each of the arched and connected support flanges 181, 181' also take a portion of the tail-stock thrust pressure load and further prevent any side movement or vibration of the tail-stock which might occur because of the high speed and heavy radial load which is applied to the arbor 110 during the extrusion of the tube U and also while the arbor is being withdrawn from the finished tube. The tail-stock is also held in perfect central longitudinal alignment with the power and forming units by the flanges 181, 181' which are provided with machined tongues that fit into grooves machined in the base plate A3.

The central body portion 180 of the tail-stock 7 has a bored hole 182 into which is fitted the arbor locking mechanism and the thrust bearing mechanism. In the lower section of the tail-stock 7 and directly under the apex of the arch connecting the supporting flanges, there is a boss 183 which is drilled to carry the reduced end section 184 of carriage traverse screw 185. The section 184 is fitted with keys to prevent the traverse screw 185 from turning. The screw is drawn tightly against the shoulder 186 by the heavy hexagon nut 187.

The thrust ball-bearing unit is made up of several detachable and renewable parts and is fitted into the hole 182 which is bored in the tail-stock 7. It comprises a ball retaining cage 188 (see Fig. 35), an outside forged or hardened steel bushing 189, and an inner conical bushing 189' which form the outer and inner races respectively on which the balls 190 revolve. The said bushing 189 is machined or ground on the outside to have a loose press fit into the said hole 182, and rests against the bottom face of said hole. The inside of this bushing 189 is machined on a taper of 30° from the longitudinal center thereof and corresponds to the taper of the hardened ball cage 188. The latter contains twelve equally spaced ball-retaining slotted holes 191 drilled at an angle of 30°. Into each of these holes 191 the six identical balls 190 are fitted, one bearing against the other and serving to fill the entire hole or slot. The thickness of the cage wall 192 is one-half the diameter of the balls and therefore, when the balls are placed in the holes, the contact surfaces of same extend outwardly and contact with the hardened face of the outer race bushing 189 and inwardly against the outer face of the conical race bushing 189'. This dual radial pressure contact is applied by thrust pressure against the inner end face 194 of the cone bushing 189' being transmitted thereto by the rear faces of the four sections of the locking ring 195 when same is locked in the groove 196 of the arbor 110 during the extrusion of the tube. The center bore of the bushing 189' has a free running fit around the enlarged shank section 197 of arbor 110. The flange of the cone race bushing 189' retains the balls 190 within holes 191 of the cage 188. The race bushing 189 is counter bored at 198 to receive the flanges of race bushing 189' and ball cage 188.

The depth of circular groove 196 in arbor 110 is slightly less than its radius. The sectional or locking ring 195 is made of special heat-treated forged steel of high tensile strength with shearing capacity of same in excess of the safety factor allowed. The radius of the arch of each segment corresponds to the radius of the groove 196 of arbor 110.

As the extrusion thrust pressure is applied to the locking rings 195 by the shoulder 199 of the arbor, a frictional contact is made between the rear faces of locking ring 195 and the forward faces of the cone 189', causing same to revolve freely within the radial ball bearings enclosed in the cage 188. The segments of the locking ring 195 are held tightly in frictional engagement with the aforesaid parts by the hardened ring bushing 200 the outside of which is slidably fitted into hole bored in the housing bushing 201. The bore in the housing has a 30° counter bore 202 which corresponds to the tapered incline on the segmental locking ring 195. The segmental locking ring is held in its proper expanding and contracting position by the flanged section thereof sliding in the slot 203 formed by the counter bore in housing 201. The ring 195 is expanded by coil springs 204 fitted into holes 205 drilled therein. Ring bushing 201 is slidably moved into a locking position around the segments of locking ring 195 by the inward movement of threaded sleeve 206 engaging in the threaded hole in housing 201. On the rear face of sleeve 206 there is fitted a hardened steel contact plate 207 that frictionally engages with the hardened forward edge of ring 200, the said edge being semi-circular in form so as to have a restricted frictional contact with the plate 206 as the full extrusion thrust load is applied to the forming end of arbor 110.

To the outer reduced end of sleeve 206 is keyed a spur gear 208 which is held tightly on sleeve 206 by a threaded retaining plate 209 screwed into sleeve 206. The plate 209 further acts as a retainer to prevent the escape of the roller bearings 210 in which the main body section of arbor 110 rotates and reciprocates. The housing 201 is attached to the tail-stock 7 by its flange 211 which is fitted into a counter bored hole machined in tail-stock, the flange being firmly attached to the tail-stock by cap screws.

Spur gear 208 is rotated by engagement with pinion 212 keyed to shaft 213 (key not shown). To the other end of shaft 213 is attached hand-wheel 214 the same being held in place by nut 215. The shaft 213 is held against longitudinal movement in its supporting bracket 216 which is bolted to the tail-stock by a thrust collar 217 fixed on to the shaft 213 by a tapered pin. The arbor chuck-operating hand-wheel 214 is located at control station 2C. When the traverse carriage 218 is in its most forward position (near the tail-stock 7) the hand-wheel 214 is convenient for the operation by the No. 2 operator, who rides the arbor traverse carriage during its reciprocating movement. By rotating the hand-wheel 214 he can quickly lock and unlock the arbor chuck as the arbor is moved into position by the traverse carriage 218.

Referring to Figs. 37 and 38, the enlarged shank 197 of arbor 110 has a slightly smaller diameter 220 on which a spur gear 221 is keyed. It is so placed that it does not allow frictional contact between hub of the gear 221 and the rear face of tail-stock when the arbor 110 is locked into its proper extrusion position. Section 222 of the arbor is journaled in arbor pedestal 223 which comprises a heavy strongly ribbed casting and said arbor is held in a longitudinal position in the bearing by a thrust collar 224 which is threaded on the end of arbor section 222 and fitted with dowel pins (not shown) to prevent the turning thereof. Pedestal 223 and cap 225 are fitted with two radial and thrust ball bearings 226. The thrust of the arbor is transmitted thru the hub of gear 221 and the thrust collar 224, while the carriage 218 is being traversed in a reciprocating movement. The ball bearings 226, however, only carry part of the radial load of the arbor 110 when same is locked in the chuck in the tail-stock 7.

A tube 227 which conveys a cooling medium, preferably water to the arbor, telescopes within the hole 228 in the arbor as the carriage 218 moves back and forth on its guides 229, 229'. These guides which are of the usual 60° V constructon are bolted to bed plate A4 and are held in accurate alignment by machined tongues fitted into grooves in bed plate A4. The arbor cooling water pressure is retained within hole 228 by a stuffing box 230 in the end 222 of arbor. Hydraulic packing fitted therein is held in place by gland 231 being so fitted that the tube 227 can slide freely. The tube 227 is further slidably supported by a guide pedestal 232, mounted on the rear of the carriage base 218 and clamped thereto by cap bolts. The base section 233 of pedestal 232 acts as a clamping cap to hold the carriage lead screw guide bushing 234 firmly in place and allows the said lead screw to have a free sliding movement therein during the reciprocating movement of the carriage. The top section of pedestal 232 is fitted with bronze flanged guide bushing 235, said bushing being held in position by collar 236 threaded thereon and the same being lubricated through oiler 237. The bushing 235 is machined to provide a free sliding movement of the water cooling tube 227 therein when the same is telescoping within hole 228 of arbor 110. The rear end of the tube 227 is fixedly attached to pedestal 238 (hereinafter more fully described).

The arbor is rotated through the following gear train: gear 221, to gear 240, to gear 241, to the motor pinion gear 242 which is keyed to shaft 243 of motor 244. The motor is preferably of sufficient power to rotate the arbor 110 at 300 revolutions per minute while the high extrusion pressures are being applied to the forming-end thereof. The gears 240 and 241 are keyed on an auxiliary jack-shaft 245. The shaft 245 is supported in pillow block 246 mounted in back of pedestal 223 and bolted to the top of the carriage base 218. Shaft 245 runs within two bearings 247, 247', and is supported on the outboard end by a bushed bracket 248, bolted to the end face of carriage 218 (bolts not shown). The arbor pedestal 223 has a flared base section 249 which is fitted into a longitudinal machined recess (not shown) in the carriage 218 the same being bolted tightly against the top of the machined side flanges (not shown) of the traverse nut cover 250 which latter acts as the upper half of a bearing for the traverse nut 251 and also has a retainer for ball thrust bearings 252, 252'. The lower half of the bearing for the traverse nut 251 is formed by a bore in a boss 253 cast in the traverse carriage base 218. On the end of the traverse nut 251 there is threaded a heavy thrust collar 254 held in position on the nut by three set screws 255 (one only shown in Fig. 38). The thrust of the traverse nut is applied to collar 254 when the traverse carriage is moving in one direction, and to the flanged end 256 of the nut when the traverse carriage is being moved in the opposite direction. In the flanged end 256 of the traverse nut 251 is a 22½° taper hole constituting the friction surface 257 of a clutch which engages by frictional contact with the tapered portion 258 on the hub of the sliding clutch gear 259. The said gear has on the other end an extended cylindrical hub portion 260 carrying a non-friction metal bushing 261 bored to have a free running fit around threads of lead screw 185. On the outside of hub portion 260 there is a circular groove 262 in which the clutch-shifting shoes 263 freely operate. The clutch-shifting shoes have trunnion bosses which are slidably fitted into slots in rocker arms of 264, 264', said arms being fitted to a squared section of the clutch throw-shaft 265 and held in proper location thereon by set screws. The reduced end 266 of the squared section is supported in a bushing fitted into a rib 267 of the carriage 218. The opposite end 268 of the throw-shaft 265 is supported by bushings 269, 269' fitted into ribs 270, 271 of carriage 218. On the end 268 of shaft 265 is keyed a worm gear segment 272 which meshes with a worm 273 keyed on a shaft 274. Said shaft runs in bearings 275, 275' which are an integral part of a bracket 276, which latter is also an integral part of the pillow block 225, and the yoke-bearing brackets 226, 226' carried thereby. On the end of shaft 274 is keyed the hand-wheel 277 (key not shown) which is attached thereon by nut 278.

The hand-wheel 277 is located at control station 3C and is within convenient reach of the operator riding the carriage 218 who either stands or is seated on the stool 279. As the hand-wheel 277 is rotated in either direction, the worm 273, meshing with the worm gear 272, rotates same in either direction, thereby throwing sliding clutch gear 259 in and out of engagement with the traverse nut, which in turn stops and starts the movement of the carriage 218. The reversing movement of the carriage is obtained by the automatic magnetic control in control box 280 (shown in dot and dash lines) situated on top of traverse carriage at control station 3C (see Fig. 40). The operator's stool 279 is attached to bracket 281 which is bolted to the outer edge of the traverse carriage 218 by cap bolts.

The gear train used to rotate the traverse nut 251 by means of motor 282 is as follows: motor pinion 283 keyed to motor shaft 284 meshes an idler gear 285 keyed to shaft 286 (key not shown) which runs in bearings 287, 287' carrying frictionless metal bushings.

The idler gear 285 meshes with clutch-gear 259, the face of which is less than the face of the idler gear 285 to allow a full tooth contact in the idler gear when the clutch-gear is either engaged or disengaged.

The bearings 287, 287' are an integral part of bracket 276 which is bolted to traverse carriage 218. The motor 282 is preferably of sufficient power and speed to traverse the carriage and attached parts in either direction at the rate of one lineal foot per second. Electric power is transmitted to the motor control box 280 thru insulated wiring (not shown) from a properly protected and insulated rail 288 bolted to back of base plate A4 and running the entire length thereof, such length being equal to the total length of travel of the traverse carriage. Contact shoe 289 forms the connection with the third rail 288 and is resiliently mounted in a terminal box 290 carried on the carriage 218. The current from the box 290 is transmitted by wiring in conduits (not shown) to the motors 244, 282. The rail, contact shoe and terminal box are shown only in Fig. 39.

The traverse carriage 218 travels, in its reciprocating movement, on V-shaped rails 291, 291' formed on a series of plates 292 bolted and splined to the base A4. The said carriage is fitted with a hand traverse mechanism for use, if necessary, at the end of its forward power stroke (see Figs. 37 and 39). The purpose of this is to provide an accurate and rapid adjustment, when needed, of the position of the carriage and the groove 196 in the attached arbor 110 relative to the locking ring 195 and its associated mechanism in the tail-stock 7. This hand traverse mechanism comprises: a hand-wheel 293, conveniently located under the operator's stool 279, at the control station 3C, is keyed to shaft 294 and held thereon by nut 295, said shaft being supported in bearings 296, 297 which are an integral part of bracket 298, the latter being bolted and doweled to the under side of carriage 218 (bolts and dowels not shown). On the end of shaft 294 is keyed a pinion 299 (key not shown) which meshes with a rack 300 bolted to the top of bed plate A4.

All of the bed plates A1, A2, A3, A4 are bolted and doweled together to form a rigid base for the machine. The bed plate A4, shown interrupted in Fig. 37, is of a proper length to allow a full traverse of carriage 218 in order to completely withdraw the arbor 110 from the finished tube U after the extrusion operation is completed.

The tube extrusion apparatus further comprises a series of inter-related functional units illustrated in the drawings as sub-assemblies and the detailed description, operation and control of these units from the different control stations are grouped as follows:

*Group 1.*—The main power unit which comprises the hydraulic cylinder, the two steam draw-back and die traverse cylinders, and a portion of the controlling mechanism, being shown in Figs. 5, 6 and 7 and being operated from main control station MC.

*Group 2.*—The sliding cross-head, to which steam piston rods and extrusion ram are attached, and which contains the hydraulic plunger locking mechanism and carries a part of the main controlling mechanism, being shown in Figs. 8, 10, 11, 12, 13, 14, 15 and 16, and being operated from main control station MC.

*Group 3.*—The split-die, the die-carrying slide rod, the split-die and plunger-locking mechanism and the die incline slide, being shown in Figs. 14, 15, 16, 17, 18, 19 and 20 and being operated from main control station MC.

*Group 4.*—The die-block and the die-locking mechanism, being shown in Figs. 14, 15, 16, 17, 19, 20, 21, 24 and 25, and being operated from main control station MC.

*Group 5.*—The tube guide boxes, the forming arbor, the top guides and supports, the tube severing mechanism and motor, the tube recovery apparatus and the tube recovery rack, being shown in Figs. 21, 24, 25, 26, 27, 28, 29, 30, 31 and 32, and being operated with the exception of the arbor from control station 2C, the arbor being however operated from control station 3C.

*Group 6.*—The tail-stock, the arbor thrust and locking mechanism, being shown in Figs. 32, 33, 34, 35, 36, 37, 38, 39 and 40, and being operated from control station 3C.

*Group 7.*—The arbor-traverse carriage, the arbor rotating mechanism, the controlling mechanism mounted on said carriage, the arbor cooling tube and supports, being shown in Figs. 37, 38, 39 and 40 and being operated from control station 3C.

The construction of the modified apparatus shown in Figs. 41 to 47 inclusive which is intended to be substituted for that portion of the apparatus between lines X and Y of Figs. 1 and 2 as hereinbefore specified, is as follows:

The metal blank 400 used has preferably a pierced or cored hole 401 (shown in dotted lines therein). The tube U' is formed by the extrusion of the metal around the extension end 403 of the ram 404 while said ram is held in the center of the die by being locked into the tapered socket end 405 of the arbor 405'.

Referring to Fig. 41 (this is generally similar to Fig. 14, excepting the different design of ram, arbor and die carrying rod), this shows the metal blank 400 in position in lower half of split die 425' ready to be traversed forward into the guide block 406 enclosed in the dies 425, 425'. The entire weight of the upper half of split-die 425 is carried upon die slide-rod 407, clamped thereto by clamping bracket 408, which is bolted to the split-die 425. The said bracket 407 is adjustable on said slide rod 407 and is locked securely in place by set screw 409. The slide rod 407 is slidably fitted into hole 410 the ends of which have bushings 411, 411', the opposite end of this slide-rod engages in the hole 412 bored in the top section of the rear cross-head housing 413 and, as the cross-head moves from the position as shown in Fig. 44 to the position as shown in Fig. 41, the spring pressed locking-pin 414 which fits in hole 415, that is bored in the cast boss 416 of the cross-head housing 413, automatically engages with hole 417 shown in dotted line in Fig. 41. A threaded cap 419, serves to hold the said spring and pin in a co-operative position. The pin is manually operated by the operator at control station MC by manipulation of lever 420 mounted in bracket 421 attached to boss 421'. The ram 404 is bolted to the cross-head housing 413 which is similar to the housing construction shown in Fig. 14 except that the enlarged flange section thereof is fitted with water circulating pipes 422, 422' which serve to conduct the cooling water for cooling the ram through the hole 423, the center of the extrusion ram 404 and into the extreme end of the extension 403 whence the water circulates rearwardly out through the hole 424. Over the ram extension end 403 there is loosely fitted a removable, conical forging collar 424 which can be quickly replaced by another one when it becomes overheated due to its contact with the heated blank 400. The tapered section of the split-dies 425, 425' have holes 426, 426' drilled therein which are fitted removable, flanged, funnel-shaped split-die liners 427, 427' the same being held in place and perfect alignment by cap bolts 428 fitted into counterbored holes 428'. Said die-liners 427, 427' are easily replaced and made of specially heat-treated die-steel to withstand, without undue deterioration, the excessive heat and pressure which are applied thereto during the extrusion of the metal.

In the bottom of the hole 429 of the die-block 406 and at a point beyond the tapered section 429' thereof there is a straight and counter-bored hole 430, which extends through the center boss-section 431 of the die-block 406 and into which is fitted a removable, flanged, cylindrical forming-die 432 which like the liners 427, 427', is made of special die-steel. This die 432 is held fixedly in position by a retaining plate 433 which is flanged and has a machined tongue 434 that fits tightly into a slot 435 machined in the die 432. Said tongue functions to hold the forming section of the die 432 in perfect shape as well as to prevent collapsing thereof and to retain the circulating water pressure therein. The circulating water inlet and outlet pipes 436, 436' are attached to the top and bottom of the retaining plate 433 by nipples 437, 437'. The die 432 is further held in its proper shape by a perforated bracing ring 438 which is tightly fitted into slot 435 and held tightly in place by the internal pressures applied to the forming section 439 of the die 432. The size of bored section 439 corresponds to the outside diameter of the extruded tube U'. The large number of holes 440 in ring 438 allows a free circulation of water therein which prevents the die from overheating and also causes the tube U' to cool quickly and the metal thereof to set in its proper shape after it is formed and while it is flowing out of the enlarged tapered section of the die. The flanged section of the retaining plate 433 is held firmly against the end face of the center boss 431 of the die-block 406 by cap bolts 441. A cut-off saw 442 serves to sever the tube into the desired length.

The forming-end 405 of arbor 405' is held in perfect central alignment in forming section 438 of the die 432, by the follower 443, the same comprising a hardened steel bushing or sleeve having a close sliding fit around the forming end 405 of the arbor and also a sliding fit in the forming section 438 of die. When the arbor forming end 405 is being projected into the mouth of the die to receive the tapered shank end 444 of the ram forming extension 403 as it travels forward and engages with the hole or socket 445 machined in the end of arbor, the follower 443 then supports the ram and the arbor in an exactly central position in the die and remains in that position until it is forced out of the die mouth by the extruding movement of the tube U' as the metal is being forced outwardly by the forging ram 404 and the forging collar 424. The different position of the follower and the action thereof are fully illustrated in Figs. 41 and 43.

The follower 443 is held in position on the arbor section 405 solely by frictional contact with a hardened steel split-ring 446 which has a compression fit in a groove 447 machined in arbor end 405. Said ring has a friction bead 448 which engages the inner bore of follower and later engages with the inside section of tube as the latter passes around the same.

As the extrusion ram and the forming end 403 thereof is forced through the die 432 and, while in engagement with the arbor 405, and, simultaneous with the flow of the metal forming the tube U' the outer end of the follower 443 enters the tube guide pedestal 449 before the die end leaves the mouth of the die 432, thereby supporting the arbor, the extrusion ram and the extruded tube at the beginning and during the entire extrusion operation.

In order that finished tube U' can be quickly and easily recovered from the guide pedestal 449 after the tube has been cut off and the arbor is withdrawn, said pedestal is fitted with a hinged split-cover 450 that is quickly thrown backwards after being unlocked by the cam locking-lever 451 which is connected by links 452 to pins 453 that are mounted on the rear of pedestal. The said split-cover section 450 is fitted with a split, renewable, flanged bushing 454, the upper half being held in position by a cap bolt 455 and the bottom half by a dowel pin 456. The guide pedestal is mounted on the raised section 457 of the main bed plate section 3B and is attached thereto by cap bolts 458, its position being close to the entrance to the main tube guide boxes hereinbefore fully described.

The drawings disclosing my invention have been detailed in assembly sections and disclose the complete details of a 6" tube extrusion machine. Obviously by changing the size of the dies, the ram and the arbor, a variable range of tube sizes can be extruded with this size of machine, the size being only restricted to the limit of the extrusion pressures that can be applied by the capacity of the hydraulic power unit employed and the maximum pressures that can be applied thereby to the extrusion ram. The maximum pressure required is some 40,000 lbs. per sq. in. to the pressure area of the ram, the minimum pressure required being 25,000 lbs. per sq. in., at the temperatures employed as shown in diagrammatic form, in Fig. 48, in which the velocity of flow is indicated by line V.

The following comprises the various operations required in the extrusion of a tube from a metal blank when employing the apparatus described in Figs. 1 to 40:

*Operation No. 1.*—A steel metal blank is heated in furnaces located close to the center of the extrusion machine, on the off-side from the operating side, (the "operating side" being the side where the main and sub-control stations and tube recovery rack are located).

When operating on either carbon steel ingots or billets, it is recommended that the metal blank be heated to a temperature of approximately 2390 deg. F. After the blank has been heated to the proper temperature, it is then removed from the furnace by traveling crane tongs and quickly introduced into the front aperture of a revolving wire brush cleaning machine, (not shown in drawings) situated conveniently to the extrusion machine wherein it is thoroughly cleaned from scale before it is introduced into the machine to be processed, this operation preferably requiring approximately 20 sec. During the cleaning operation, the heated blank will lose some of its heat, maintaining, however a temperature of not less than about 2350 deg. F. at the time it is projected into the lower half of the split-die. This entire operation is performed during operation No. 7 and therefore no loss of time occurs.

*Operation No. 2.*—The heated blank, before the forward traverse power is applied to the cross-head to which the sliding split-die is attached, will be in the position shown in Fig. 14. The operator, by a movement of the impulse valve lever located at the main control station MC, admits a sudden impulse of steam into the front end of both of the traverse or draw-back cylinders, causing the pistons therein and the sliding crosshead attached thereto to be traversed forward speedily until the movement is arrested by the automatic action of the cut-off slide valves. The lower half of the split-die, which carries the heated blank, is raised to the proper alignment with the die block and the top half of the split-die by the incline or slide B. As the lower half of the split-die is advanced to position, the two halves automatically align themselves around the heated blank and the same are held in close contact and perfect registry with each other by the engagement of four dowel pins which are fitted into the split faces of the lower die and engage with holes machined in the upper half of the split-die.

As the tapered end section of the split-die comes in contact with the tapered bored hole in the bottom of the die block, two spring controlled locking pins, located near the open end of the die-block, automatically lock both halves of the split-die fixedly in place, closing tightly around the heated blank which is now in the proper position to apply the extrusion ram pressure thereto.

Simultaneously with the die being locked into the die-block, the hydraulic plunger chuck-ring automatically engages with the groove in the hydraulic plunger and is manually locked to the sliding crosshead by the operator at the main control station. The time required for this die-closing operation is preferably approximately 10 sec.

*Operation No. 3.*—The close sliding fit of the ram in the split-die, and the tight closure of the split-die in the die block, insures the exclusion of all air from the extrusion chamber, thereby preventing oxidation of the heated blank during the extrusion process and during the time the metal is flowing through the funnel shaped section of the die and out through the opening thereof and around the revolving arbor.

The extrusion pressures are applied by the operator at the main control station MC, by opening the first stage hydraulic inlet valve to the hydraulic cylinder and the further opening of the second and third stage valves progressively during the hydraulic plunger stroke.

It is desirable, when extruding a 20 ft. length of tubing from a billet of say 425 lbs., that for the first 60% of the stroke a hydraulic pressure of about 2500 lbs. be applied to the plunger. Such pressure is equivalent to an extrusion ram pressure of about 25,500 lbs. to the sq. in.; for the next 25% of the stroke a hydraulic plunger pressure of about 3000 lbs. is applied to the plunger, this producing a ram pressure of about 30,000 lbs. to the sq. in.; and for the final squeeze, or the last 15% of the ram stroke, 3500 lbs. hydraulic pressure is applied to the plunger producing a ram pressure of about 37,000 lbs. to the sq. in.

The progressively applied increased pressures are for the purpose of maintaining a constant and uniform velocity of flow of the metal through the die regardless of the loss of plasticity in the blank due to the cooling of the metal as it flows through the die and around the arbor. (See plasticity flow sheet Fig. 48.)

By the application of the above hydraulic pressures in accordance with the principles and velocities as shown in said flow sheet, the extrusion ran travels at the velocity of 1" per second, causing a tube extrusion velocity of 1' per second. The plasticity flow sheet pressures, temperatures and velocities having been computed for the production of tubing to be used as 6" extra heavy pipe of A. S. M. E. standard specifications, it is of course necessary when producing tubing of lesser wall thickness that, in order to maintain the same velocity of flow, higher extrusion pressures should be applied at different portions of the ram stroke than those indicated in said flow sheet.

The rapid flow of metal through the funnel-shaped die, with its reduced opening in the forming end and the rapid swirl of same, due to the high extrusion pressures being applied thereto while the forming end of the arbor is revolving at a high speed, causes a violent molecular motion and modifies materially the molecular structure of the metal blank. Furthermore the said swirling motion of the metal while under pressure eliminates all defects inherited from the casting of the metal blank and in effect accomplishes a complete kneading or working of the metal while under high pressure.

All the mechanical movements which control the uniform velocity of flow of the metal in the die by outwardly applied pressures of the ram and the reacting centrifugally applied pressures of the forming arbor are completely controlled by the operator at the main control station. The forming die, the piercing and forming arbor and also the extrusion ram are preferably constructed of special heat-resisting alloy steels and these parts are also preferably all water cooled to prevent excessive deterioration and wear. The total time required for the third stage is preferably but about 25 seconds.

*Operation No. 4.*—Upon the completion of the third operation, the main control operator quickly closes the hydraulic valves through which the three stages of hydraulic pressure are applied and in the same movement opens all the valves to an outlet or exhaust position thus releasing all the forward pressure in cylinder. Through a control lever located at the main control station, the two-way valve located on the front head of the hydraulic cylinder is opened, the plunger having been previously locked to the sliding crosshead to which the extrusion ram is also attached and thereby an hydraulic drawback pressure of 500 lbs. per sq. in. is applied to the crosshead. Such backward movement withdraws the ram from the die matrix and away from the end face of the nubbin.

When the hydraulic plunger drawback stroke is completed, the extrusion ram automatically locks itself with the top half of the split die and the operator then by rotating the hydraulic plunger locking wheel quickly effect the unlocking of the plunger from the crosshead. He then opens the steam impulse valve leading to the front end of the draw-back cylinders, thereby giving the crosshead a backward movement which effect the withdrawal of the split die from the die-block. The top half of the die being however locked to and resting upon the extrusion ram, the bottom half of the die, as it is drawn from the incline slide, will fall away therefrom, thus allowing the nubbin to be quickly recovered from the lower half of the die.

The locking clutch in crosshead being in an open position allows a free sliding movement of the crosshead over the extension end of the hydraulic plunger, it telescoping within the hydraulic body section of the same as it travels backwards.

The top die support moves parallel to the movement of the ram and the interlocking of these two members prevents the further independent movement of the ram from the dies and leaves the ram in the proper position relative to the split-dies for the next extrusion stroke. The time consumed in this fourth operation is preferably but about 12 seconds.

*Operation No. 5.*—Simultaneous with operation No. 4, the operator at control station 3C, who is riding on the top of the arbor traverse carriage, releases the arbor clutch in the tail-stock, and reverses the motor, which is driving the arbor about 300 R. P. M. preferably, from clockwise to anti-clockwise, and at the same time he rotates a hand wheel which engages the gear clutch with the threaded traverse nut, said nut being thereby rotated at high speed around the corresponding threads of the stationary lead screw, which locking movement traverses the carriage arbor and all connected parts rearwardly and affects the rapid withdrawal of the arbor from the finished extruded tube, while the rotation of the forming end of the arbor has a reaming and straightening effect on the tube during the withdrawal thereof. The traverse velocity of the arbor and reciprocating movement thereof, is preferably at the rate of about 125 lineal feet per min. The time of operation No. 5 is preferably about 15 seconds.

*Operation No. 6.*—As quickly as the arbor has been withdrawn from that part of the tube that is in the mouth of the die, the operator at station 2C revolves a hand wheel connected to a threaded shaft which slides the saw carriage, with its motor driven, high speed, cut-off saw, into position for cutting the desired length of tube from the nubbin close to the mouth of the die. When the tube has been cut-off the saw is then returned to its resting position.

The tube top guide shoes which are located directly over the center of the tube are released and are drawn upwards out of contact with the tube, and to a sufficient height to allow the free movement of the finished tube when it is being raised out of the lower roller guide boxes. The simultaneous lifting of all the guide shoes is accomplished by the operator at control station 2C merely by pressing down on the lever which is connected to a shaft that carries a series of forked arms cooperating with the shafts of all the vertical guide shoes and thereby raises all of the guide shoes simultaneously against the action of the coil springs. After the tube has been recovered from the lower guide boxes, the operator releases this lever and the vertical guide shoes return to their original position and are in place ready to guide and hold centrally the next tube to be extruded.

During the time the operator is holding the upper guide shoes in their upper position, he presses downward the recovery or throw-out lever located adjacent to the top guide lever, which is connected to a shaft resting in bearings attached to the side of the lower guide boxes. On this shaft are keyed at equal distances apart five hooked shaped arms which arms extend from the shaft inwardly to the center of the machine at right angles to the tube. These arms when not in use are held down to a clearance position with respect to the tube by their coil springs. As the recovery lever is pressed downward, these arms are elevated into contact with the bottom of the tube and by their radial, and upward movement the finished tube is lifted out of the lower guide boxes and is projected onto the incline recovery rack, to be conveyed later, when cooled to the finishing department. The time of this sixth operation is about 15 seconds.

*Operation No. 7.*—After the tube has been cut off from the nubbin during operation No. 6, the operator at main control station M C opens the main steam impulse valves of both draw back cylinders, allowing a sudden impulse of live steam pressure to be applied to the front end of the pistons, such pressure being sufficient to break away the split-die from the die block and at the same time to effect the withdrawal of the tubular section of the nubbin remaining in the mouth of the die. Before another heated blank is projected into the lower half of the split-die preparatory to another cycle of operations all scale is blown out of the dies and die-block by an air blast. During the draw back movement of the crosshead, the hydraulic plunger remains stationary in its proper position ready to be locked in place by the geared clutch on its next forward stroke. The time for this operation is preferably about 20 seconds.

*Operation No. 8.*—While operation No. 7 is in progress, the operator at station 3C traverses the arbor back into the mouth of the die and the forming end thereof is held in a perfectly central position in the mouth of the die by the entry of the follower sleeve slidably attached and fitted to the forming end of the arbor, said sleeve having also a close sliding fit in the mouth of the die. The follower is later forced out of the die by the extruded tube.

When the arbor has reached its proper position in the mouth of the die, the enlarged driving end of the arbor is resting in its bearing in the tail stock and, as the arbor reaches its proper position the thrust groove thereof, automatically engages with the spring-acting clutch rings, being thereby locked firmly in place against the conical, ball-thrust-bearing fitted in the tail stock.

The operator at sub-station 3C then applies and effects the clockwise rotation of the arbor which is in a position to receive the extruded tube as it flows out of the mouth of the die. As this operation is performed simultaneously with the entire operation of No. 7 no extra time is required therefore.

During all the stages of the complete cycle of operations, the operator at station 3C remains on and rides the carriage during its reciprocating movement. The total time required to complete a full cycle of operations for converting a metal, blank weighing 625 lbs. into a finished 6″ outside dimension extra heavy standard tube 20 ft. long is preferably but about 1 minute and 37 seconds.

The operation of the modified apparatus shown in Figs. 41 to 47 inclusive are identical with the apparatus hereinbefore illustrated, except that the controls provide for a longer stroke of the extrusion ram and a consequently longer draw-back stroke of same and with the further difference that the arbor 405 is not locked within the tailstock or the thrust taken thereby and is not rotated during the actual extrusion of the tube, although it is rotated anti-clockwise during its withdrawal from the tube. Otherwise the main movements of the apparatus disclosed in Figs. 1 to 40 and the operating time thereof, apply equally as well to this modified process as shown in Figs. 41 to 47 inclusive.

The pipe or tubing produced by my improved process whether formed from wrought iron or steel, has a wall of homogeneous texture and of uniform thickness throughout and the pearlite scales, which are characteristic of wrought iron and steel as aforesaid, are so oriented in the flow of the metal through the restricted extrusion exit orifice during the extrusion operation that substantially all of these pearlite scales or plates have an approximately uniform unidirectional trend with their shortest axis at substantially right angles to the direction of flow of the axis of the pipe or tubing. Furthermore in the case of wrought iron pipe or tubes, in particular, in which the slag is presented in the form of fibres which, even in rolling operations, tend in the surface portion of the metal to arrange themselves in the direction of rolling, the wall of such pipe or tubes, produced in accordance with my invention, have these fibres disposed throughout the entire wall of the pipe, as distinguished from merely superficially thereof, in substantially longitudinal alignment axially of the pipe.

While my improved process is peculiarly adapted for the production of tubular shapes from mild or low carbon steel and wrought iron, it is also applicable to the production of such shapes from special or alloy steels such for example as vanadium steel, nickel steel, maganese steel, chrome steel, stainless steel and the like.

I am well aware of the various patents to J. Robertson commencing in 1889, the first of which is No. 411,109, and extending up to about 1903 when Patent No. 493,946 issued and also the patents to D. L. Summary, Reissue No. 13,563 and No. 1,317,238 as well as the patents to J. W. Leighton and O. J. P. Crick No. 1,310,122, to J. P. Sneddor No. 1,375,426 and to J. A. Potter Nos. 551,229 and 567,410, but neither of these patents discloses the essential features herein described in detail which enable me to make under high speed production conditions, commercial lengths of ferrous metal seamless pipe and consequently I disclaim any apparatus or method such as set forth in these patents. As a matter of fact these patents relate chiefly to the production of boiler tubes or relatively short lengths of tubing as distinguished from lengths of commercial pipe which average from 20 to 30 feet in length. The machines employed in extruding ferrous metal pipes in accordance with my invention, as compared to the art of extruding relatively short tubular lengths, are quite different and present many intricate mechanical problems, due to the varying stepped up pressures employed, the rapid speed of the various operations and the means necessary for guiding and straightening the extruded tube as well as the final severing from the nubbin and rapid recovery of same from the apparatus when the extrusion operation is completed.

In extruding long tubes or pipes in accordance with my invention, the tube guide and arbor-centering system functions rapidly and accurately in order to maintain the uniform wall thickness of the tube, while it is issuing from the mouth of the die, the varying degrees of temperature in the finished tube, make it necessary for the entire guide system to be flexible enough to allow a floating or elastic flow of the metal around the forming-arbor, while it is revolving at high speed within the tube and at the same time the guide system is sufficiently rigid to accurately support the tube which in turn supports the arbor, to maintain the forming end of said arbor in perfect central alignment in the exit orifice of the forming die. The slight spring-controlled elastic movement of both the top and bottom guides combined with high speed rotating movement of the arbor-forming end over which the tube is formed, causes such forming end to maintain, under centripetal action a perfect central position in the metal blank as its high speed action bores its way into the center of said blank as it is being extruded over same and into the space between the straight forming-section of the arbor and the inside forming-wall of the straight section of the die. The flexible action of the arbor supported inside the tube, combined with its high speed revolving movement also has a like centering effect in the blank similar to that obtained by the use of a floating boring bar when boring a long hole within a metal bar such as is common machine shop practice in large gun boring operations.

Other advantages of this tube-guide and support-system are the equal distribution of the weight of the tube and the arbor over a large number of lower roller guides, and the top support of a number of upper guide shoes spaced at equal distances apart, on a direct vertical line above the tube which elastically prevents the tube and arbor therein from bucking or bending during the passage of the tube over the arbor. After the tube has been extruded, the top and bottom guides hold the same in an elastic central position while the arbor is being withdrawn from the tube, and while it is being revolved at high speed, anti-clockwise, the long forming-section of the arbor, that is preferably about two feet in length, which fits tightly within the hole of the tube, reams and straightens said hole and the tube during its withdrawal. After the arbor is withdrawn and the tube straightened, it is then severed from the nubbin and all the top guide shoes are quickly released from their contact with the tube, so the tube can be quickly recovered from the lower guide boxes on to the recovery rack. By the use of this elastic guide system a very rapid flow of the extruded tube can be accommodated without the danger of choking, piling, upsetting or buckling of the metal which action would affect the uniformity of the wall thickness of the tube and the quality of the finished product.

The aforesaid conical thrust and radial ball bearing for the tube-forming arbor is a new departure from the usual bearings used for heavy duty service. It comprises a complete, quickly-removable and renewable unit that is assembled within a fully self-contained housing which fits within and is bolted to the center boss of the tailstock member. The purpose of the type of bearing is to provide an efficient anti-friction thrust bearing unit that will effectively withstand the excessively high thrust pressures applied to the forming end of the arbor by the extrusion ram pressure action upon the heated metal blank that is being extruded around the forming-end of the arbor while it is being revolved at the recommended speed of about 300 R. P. M., the rotating power being applied through a train of reduction gears by a heavy duty reversing motor of sufficient power to revolve the arbor at the maximum speed while the thrust load is being applied thereto without undue overloading of the motor.

The conical ball cage comprises a tapered sleeve before being machined, being preferably made of cast bronze, and the ball retaining holes or slots are properly spaced in the wall and drilled at the proper angle, by the use of a heavy duty drill press which has a specially designed drill-pot and drilling jig, used in connection with a multiple angular drill head all of which permits the drilling of all the holes in the cage in one operation. It is essential that the thickness of the cage walls shall not be substantially greater and in fact is preferably less than the width between opposing margins of the slots as otherwise the balls would not engage the respective inner and outer raceways of the bearing. The cage has annular stiffening rims at its respective ends, and the ball receiving slots extend through the rim at the larger end thereby admitting of the insertion of the balls into said slots.

As is evident from an inspection of the plasticity flow sheet shown in Fig. 48, which is predicated on a flow of metal at one lineal foot per second and in which the degree of plasticity is based on an arbitrary scale ranging from 500 downwardly, it is possible to quickly determine the amount of pressure required, at the changing temperatures during the actual extrusion operation, in order to maintain such uniform flow of metal during the production of any given length of pipe. For example, if the initial temperature of the blank, when introduced into the dies, is 2360° F., and the initial pressure applied thereto is 25,000 lbs. per square inch, then, as indicated by the flow line V, the pressure must be gradually stepped-up in order to maintain the uniform rate of flow of the metal so that, by the time a 20 foot length of pipe has been extruded (as per figures along upper margin of diagram) since the plasticity will have dropped to 300 (arbitrary scale), which corresponds to the plasticity of the metal at 2130° F., a pressure of 35,000 lbs. per square inch will have to be applied for the final squeeze.

In the extrusion of short lengths of tubes, for example boiler tubes, the cooling off of the metal does not involve the difficulties present in the manufacture of long lengths of tubing and pipes, say in excess of 10 feet and preferably 20 feet to 30 feet in length and consequently in certain of the claims a minimum limitation is fixed upon the length of the tubing obtained. However, I do not restrict my invention merely to the production of long lengths of tubing or pipes, as the employment of my improved apparatus and method, even in the production of shorter lengths of tubing and pipes is extremely advantageous, though these advantages are possibly not so essential as in the production of the longer length of tubing and pipes which are intended for high temperature and high pressure duty and especially oil pipe lines, oil well pipes and casings, high and low pressure steam, gas and water mains, tubular structural shapes, etc.

While in the plasticity flow sheet and elsewhere herein, I have referred to certain pressures being employed in the operations, it is understood that the same are merely illustrative and it is not intended, except when specific limitations are set forth in the claims, to limit the invention to these particular pressures or within such particular pressure ranges.

While this invention is primarily suited for the extrusion of ferrous metal shapes, it is equally applicable to the extrusion of thermo-plastics, such as pyroxylin and other cellulose ester plastics, phenolic resins, casein, rubber and the like where high pressures are required, it being merely necessary to modify the temperatures and pressures set forth herein to conform to the limits permissible in the extrusion of such plastics.

Various changes within the scope of the appended claims may be made without departing from the spirit of the invention as herein described and claimed.

Having thus described my invention, what I claim and desire to obtain by United States Letters Patent is:

1. The method of extruding tubular shapes of ferrous metal which consists in heating a mass of metal, of sufficient cubical content to form a tubular shape of the desired length, to a plastic condition and well below the melting point thereof, quickly introducing the same into a die, then inserting said die into a die-pot having an exit orifice of a diameter corresponding to the external diameter of the shape desired, subjecting the metal while confined in said die-pot to a pressure sufficient to effect the extrusion thereof through said orifice while simultaneously opposing the free passage of metal through said orifice by subjecting the metal during the extrusion to a centrifugal forming action of a rapidly rotating arbor of an external diameter corresponding to the internal diameter of the desired tubular shape, whereby the shape is extruded over said arbor, withdrawing said arbor, while still rotating, from said shape, cutting off the desired length of the tubular shape and recovering the severed length thereof so obtained.

2. The method of extruding tubular shapes of ferrous metal which consists in heating a mass of metal, of sufficient cubical content to form a tubular shape of the desired length, to a plastic condition and well below the melting point thereof, quickly introducing the same into a die, then inserting said die into a die-pot having an exit orifice of a diameter corresponding to the external diameter of the shape desired, subjecting the metal while confined in said die-pot to a pressure sufficient to effect the extrusion thereof through said orifice while simultaneously opposing the free passage of metal through said orifice by subjecting the metal during the extrusion to a centrifugal forming action of a rapidly rotating arbor of an external diameter corresponding to the internal diameter of the desired tubular shape, whereby the shape is extruded over said arbor, elastically supporting said arbor prior to the extrusion of the tubular shape thereover and then similarly supporting the free end of the tubular shape as extruded from said die-pot, withdrawing said arbor, while still rotating, from said shape, cutting off the desired length of the tubular shape and recovering the severed length thereof so obtained.

3. The method of extruding tubular shapes of ferrous metal which consists in heating a mass of metal, of sufficient cubical content to form a tubular shape of the desired length, to a plastic condition and well below the melting point thereof, quickly introducing the same into a split-die, then inserting said die into a die-pot having an exit orifice of a diameter corresponding to the external diameter of the shape desired while simultaneously effecting the closure of split-die, subjecting the metal while confined in said die-pot to a pressure sufficient to effect the extrusion thereof through said orifice while simultaneously opposing the free passage of metal through said orifice by subjecting the metal during the extrusion to a centrifugal forming action of a rapidly rotating arbor of an external diameter corresponding to the internal diameter of the desired tubular shape, whereby the shape is extruded over said arbor, artificially cooling said extruded shape immediately after the issuance of the same from said exit orifice, withdrawing said arbor, while still rotating from said shape, cutting off the desired length of the tubular shape and recovering the severed length thereof so obtained.

4. The method of extruding tubular shapes of ferrous metal, which consists in heating a mass of metal, of sufficient cubical content to form a tubular shape of the desired length, to a plastic condition and well below the melting point thereof, quickly introducing the same into a confining die of tapered configuration being of smallest cross-section at its exit end and having an exit orifice of a diameter corresponding to the external diameter of the shape desired, subjecting the metal while so confined to a pressure sufficient to effect the extrusion thereof through said orifice and to thoroughly work the metal and eliminate any blow holes, gas pockets and certain other imperfections of the texture thereof while simultaneously opposing the free passage of the metal through said orifice by subjecting the metal during the extrusion to a centrifugal forming-action of a rapidly rotating arbor of an external diameter corresponding to the internal diameter of the desired tubular shape, whereby the shape is extruded over said arbor, withdrawing said arbor from said shape, cutting off the desired length of the tubular shape and recovering the several length thereof so obtained.

5. A unitary apparatus for the extrusion of tubular shapes, comprising an extrusion ram element, means for applying high pressure thereto, a die having an opening at one end to receive the ram and an exit orifice, die-confining means having an extrusion orifice at one end thereof, a reciprocatable forming-arbor adapted to project into said extrusion orifice, guide means for supporting the extruded shape as extruded from the die and means for inter-connecting the pressure unit, the die-confining means and the arbor-reciprocating means into a unitary structure while permitting of the proper functioning of the same.

6. A unitary apparatus for the extrusion of tubular shapes, comprising an extrusion ram element, means for applying progressively increasing high pressures thereto during the extrusion operation, a die into which said ram is adapted to project and having an exit orifice, the bore of said die varying considerably in cross-section between the ends thereof, die-confining means having an extrusion exit orifice, a reciprocatable forming-arbor adapted to partially obstruct the extrusion orifice during the extrusion operation, the forming end of said arbor being of a maximum external dimension corresponding to the maximum internal dimension of the extruded shape, means for reciprocating said arbor and means for inter-connecting the pressure unit, the die-confining means and the arbor-reciprocating means into a unitary structure while permitting of the proper functioning thereof.

7. A unitary apparatus for the extrusion of tubular shapes, comprising a pressure unit, an extrusion ram operatively associated therewith, a split die adapted to be interlocked therewith and die-confining means into which the die is adapted to be projected, a reciprocating forming arbor adapted to project into one end of said die-confining means, and a main control station and sub-control stations for operating in orderly succession the pressure unit, to vary the pressure exerted upon the ram, and the movement of the forming-arbor with respect to the die-pot to effect the final straightening operation on the extruded shape in said apparatus prior to the severing of the shape into the desired lengths.

8. An apparatus for extruding tubes from ferrous metal, comprising a ram, means for applying successively increased pressures thereto while said ram is in motion, a die, having an exit orifice, for confining a blank during the extrusion operation, the bore of said die being of considerably varying cross-section longitudinally thereof, die-confining means, a rotatable and longitudinally reciprocatable arbor adapted to be periodically projected into the exit orifice of said die-confining means and means for interconnecting the pressure unit, the ram, the blank-confining means and the arbor unit and a plurality of control stations for effecting in orderly succession the various operations during the extrusion of the pipe.

9. In an apparatus for extruding tubular shapes, the combination comprising a ram, a multi-stage power unit adapted to apply progressively increasing pressures to said ram during the extrusion operation, a die for confining a blank during the extrusion operation and having an orifice for the reception of the end of said ram and also an exit orifice, die-confining means, a reciprocating arbor adapted to periodically project into said exit orifice of the confining means and means for maintaining the speed of extrusion of the tubular shape substantially uniform throughout the extrusion operation.

10. In an apparatus for extruding tubular shapes, the combination comprising a power pressure unit, a ramming element, a die-pot, a die adapted to be confined therein, said die-pot having an exit extrusion orifice, a reciprocating forming-arbor adapted to periodically project into said orifice, means for reciprocating said forming-arbor, means for cutting the extruded shape into predetermined lengths, control stations for effecting the various operations to be performed on a blank during the extrusion thereof in orderly succession and means for operatively interconnecting the various units of the apparatus so as to maintain the same in their proper alignment and position during the extrusion operation.

11. In an apparatus for extruding tubular shapes, the combination comprising a reciprocating ram, means for applying progressively increased pressures to said ram during the forward movement thereof, a die-pot having an exit extrusion orifice operatively interconnected with the ram and with the pressure applying unit, a split-die adapted to enclose to snugly fit within said die-pot, means for effecting the closure of said split-die and its subsequent projection into the die-pot, a forming-arbor of an external diameter of the shape desired, means for simultaneously rotating and longitudinally reciprocating said arbor, means for temporarily centrally positioning the forming-end of said arbor in said exit orifice during the extrusion operation, means for operatively interconnecting the various units of the apparatus in order to maintain them in their operative relations with respect to each other during the extrusion operation and means for effecting the different operations during the extrusion of the shape in synchronized orderly succession.

12. In an apparatus for extruding tubular shapes, the sub-combination comprising a die-pot, a split-die associated therewith, a ram element upon which said split-die is mounted, which ram element is movable relative to said split-die and means for simultaneously effecting the closure of said die and its projection into said die-pot.

13. The method of extruding tubular shapes of ferrous metal, which comprises subjecting a blank of ferrous metal, while heated to a plastic condition and while confined in a die having an exit extrusion orifice, to progressively increasing ramming pressures sufficient to maintain the speed of extrusion of said shape through said orifice substantially constant.

14. The method of extruding tubular shapes of ferrous metal, which comprises subjecting a blank of ferrous metal while heated to a plastic condition and while confined in a die of reduced cross-section adjacent its exit end to progressively increase pressures sufficient to maintain the speed of extrusion of the shape through said orifice substantially constant and to effect the working of the plastic mass in the die prior to the extrusion thereof.

15. In an apparatus for making seamless extruded metal shapes, the combination comprising a multiple cylinder, fluid pressure unit adapted to deliver stepped-up pressures during the extrusion operation, a main piston member reciprocating in said unit a plunger secured thereto, a cross-head slidably connected to said plunger, guides for said cross-head, a ram element carried by said cross-head, a split-die adapted to be interlocked periodically with the cross-head, said die comprising two symmetrical halves hingedly connected together, one of said halves being supported against movement in a vertical plane, an inclined slide adapted to co-operate with the other half of said die and to effect the closure of the same against the opposing half of said die during the forward motion of said ram, die-confining means associated with said incline into which such split-die is adapted to be projected by said ram, said split-die and said die-confining means each having an exit orifice through which the metal of a blank is adapted to be extruded, a longitudinally reciprocating arbor mounted remote from said die-confining means, the end of said arbor being adapted to periodically project into the exit orifice in said die-confining means, a follower sleeve mounted on said arbor, said sleeve being adapted to be impelled along said arbor by the metal extruded through said orifice in the die-confining means, means for guiding a tube as it is extruded over said arbor and means for reciprocating said arbor so as to periodically project the same into said exit orifice in the die-confining means and to withdraw the same from the length of the pipe extruded over said arbor.

16. In an apparatus for extruding metal shapes, the sub-combination comprising a split-die normally adapted to remain in an open position, die-confining means into which said die is adapted to be projected and means for automatically effecting the closure of said die as it is projected into said die-confining means.

17. The method of extruding a tubular shape which comprises subjecting a blank of the material from which the shape is to be formed while in a plastic condition and while confined in a die having an extrusion exit orifice to progressively increased pressures while maintaining the flow of the material through the said extrusion exit orifice at a substantially uniform rate of speed throughout the entire extrusion operation.

18. The method of extruding a tubular shape which comprises subjecting a blank of the material from which the shape is to be formed while in a plastic condition and while confined in a die having an extrusion exit orifice to progressively increased pressures while maintaining the flow of the material through the said extrusion exit orifice at a substantially uniform rate of speed throughout the entire extrusion operation, said tubular shape being caused to flow around a rapidly rotating forming-arbor and said forming arbor being withdrawn from the extruded tubular shape when the extrusion is completed while said arbor is still rapidly rotating.

19. In an apparatus for extruding hollow shapes from plastic material, the sub-combination comprising a split-die, die-confining means, a ramming element and means for periodically interlocking said split-die and said ramming element to effect the withdrawal of the split-die from the die-confining means and to admit of the removal of the nubbin from the split-die.

20. The method of extruding tubular shapes of ferrous metal, which comprises effecting the extrusion of a blank of ferrous metal while heated to a plastic condition and while confined in a die around a forming arbor while effecting relative movement between said forming arbor and said die and while subjecting said blank to progressively increasing pressures sufficient to maintain the speed of extrusion of the shape through said orifice substantially constant throughout the extrusion operation, such treatment of the plastic mass serving to effect the thorough working of the same in the die prior to the extrusion thereof.

21. In an apparatus for extruding tubular shapes, the combination comprising a die for confining a blank during the extrusion operation and having an exit orifice, die container means, a reciprocating arbor adapted to be periodically projected into proximity of the exit orifice of the die and to close the central portion of said orifice while leaving a marginal annulus for the extrusion of the blank therethrough, means for exerting a high pressure on said blank and effecting its extrusion through said annulus so formed between the arbor and the periphery of the exit orifice and means for effecting relative movement between said arbor and said die during the extrusion operation.

Signed at New York, in the city, county and State of New York, this 10th day of May 1929.

STANLEY W. SPARKS.